United States Patent
Chan

(10) Patent No.: US 6,963,616 B2
(45) Date of Patent: *Nov. 8, 2005

(54) ADAPTIVELY CONFIGURABLE CLASS-A/ CLASS-B TRANSMIT DAC TO TRANSCEIVER EMISSION AND POWER CONSUMPTION CONTROL

(75) Inventor: Kevin T. Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/717,127

(22) Filed: Nov. 19, 2003

(65) Prior Publication Data

US 2004/0105504 A1 Jun. 3, 2004

Related U.S. Application Data

(63) Continuation of application No. 10/091,099, filed on May 5, 2002, now Pat. No. 6,690,742, which is a continuation of application No. 09/568,520, filed on May 9, 2000, now Pat. No. 6,389,077, which is a continuation of application No. 09/399,202, filed on Sep. 17, 1999, now Pat. No. 6,185,263, and a continuation of application No. 09/429,893, filed on Oct. 29, 1999, now Pat. No. 6,259,745.

(60) Provisional application No. 60/106,265, filed on Oct. 30, 1998, provisional application No. 60/107,105, filed on Nov. 4, 1998, provisional application No. 60/107,702, filed on Nov. 9, 1998, and provisional application No. 60/108,001, filed on Nov. 11, 1998.

(51) Int. Cl.$^7$ .............................. H04B 3/00; H04L 27/04

(52) U.S. Cl. ......................................... 375/257; 375/295

(58) Field of Search ................................ 375/257, 258, 375/295; 327/108

(56) References Cited

U.S. PATENT DOCUMENTS

| | | | | | |
|---|---|---|---|---|---|
| 5,267,269 | A | * | 11/1993 | Shih et al. | 375/296 |
| 5,483,551 | A | * | 1/1996 | Huang et al. | 375/219 |
| 5,506,537 | A | * | 4/1996 | Kimura | 327/351 |
| 5,640,605 | A | * | 6/1997 | Johnson et al. | 710/61 |
| 5,896,417 | A | * | 4/1999 | Lau | 375/258 |
| 5,940,387 | A | * | 8/1999 | Humpleman | 370/352 |
| 6,185,263 | B1 | * | 2/2001 | Chan | 375/295 |
| 6,201,796 | B1 | * | 3/2001 | Agazzi et al. | 370/286 |
| 6,229,788 | B1 | * | 5/2001 | Graves et al. | 370/230 |
| 6,259,745 | B1 | * | 7/2001 | Chan | 375/285 |
| 6,332,004 | B1 | * | 12/2001 | Chan | 375/257 |
| 2004/0105503 | A1 | * | 6/2004 | Mohamadzade | 375/257 |

* cited by examiner

Primary Examiner—Tesfaldet Bocure
(74) Attorney, Agent, or Firm—McAndrews, Held & Malloy

(57) ABSTRACT

A power efficient and reduced electromagnetic interference (EMI) emissions transmitter for unshielded twisted pair (UTP) data communication applications. Transmit data is processed by a digital filter. The digital filter output data is converted to a current-mode analog waveform by a digital-to-analog converter (DAC). The digital filter is integrated with the DAC binary decoder in a memory device such as a ROM with time multiplexed output. DAC line driver cells are adaptively configurable to operate in either a class-A or class-B mode depending on the desired operational modality. A discrete-time analog filter is integrated with the DAC line driver to provide additional EMI emissions suppression. An adaptive electronic transmission signal cancellation circuit separates transmit data from receive data in a bidirectional communication system operating in full duplex mode. For a multi-transmitter system, timing circuitry staggers the time base of each transmitter to reduce the aggregate EMI emissions of the multi-transmitter system.

8 Claims, 26 Drawing Sheets

| Class-A | | | | | | | | |
|---|---|---|---|---|---|---|---|---|
| In0 | In1 | a | b | c | d | Ip | In | Diff. Mode | Com. Mode |
| 1 | 1 | 0 | 1 | 1 | 0 | I | I | 0 | 2I |
| 0 | 1 | 1 | 0 | 1 | 0 | 2I | 0 | 2I | 2I |
| 1 | 0 | 0 | 1 | 0 | 1 | 0 | 2I | -2I | 2I |

| Class-B | | | | | | | | |
|---|---|---|---|---|---|---|---|---|
| In0 | In1 | a | b | c | d | Ip | In | Diff. Mode | Com. Mode |
| 1 | 1 | 0 | 0 | 0 | 0 | 0 | 0 | 0 | 0 |
| 0 | 1 | 1 | 0 | 1 | 0 | 2I | 0 | 2I | 2I |
| 1 | 0 | 0 | 1 | 0 | 1 | 0 | 2I | -2I | 2I |

Fi = FREQUENCY OF EMISSION IMAGES
M = NUMBER OF TRANSMITTERS TO STAGGER

ADAPTIVELY CONFIGURABLE CLASS-A/CLASS-B TRANSMIT DAC TO TRANSCEIVER EMISSION AND POWER CONSUMPTION CONTROL

CROSS-REFERENCE TO RELATED APPLICATIONS

This patent application is a continuation of U.S. patent application Ser. No. 10/091,099, filed Mar. 5, 2002, now U.S. Pat. No. 6,690,742, issued Feb. 10, 2004, which is a continuation of U.S. patent application Ser. No. 09/568,520, filed May 9, 2000, now U.S. Pat. No. 6,389,077, issued May 14, 2002, which is a continuation of U.S. patent application Ser. No. 09/399,202, filed Sep. 17, 1999, now U.S. Pat. No. 6,185,263, issued Feb. 6, 2001, entitled "ADAPTIVELY CONFIGURABLE CLASS-A/CLASS-B TRANSMIT DAC FOR TRANSCEIVER EMISSION AND POWER CONSUMPTION CONTROL," and is a continuation of U.S. patent application Ser. No. 09/429,893, filed Oct. 29, 1999, now U.S. Pat. No. 6,259,745, issued Jul. 10, 2001, entitled "INTEGRATED GIGABIT ETHERNET TRANSMITTER ARCHITECTURE," which claims the benefit of the filing date of U.S. Provisional Patent Applications Ser. Nos. 60/106,265, filed Oct. 30, 1998, and entitled "POWER EFFICIENT AND REDUCED EMI EMISSIONS TRANSMITTER," 60/107,105, filed Nov. 4, 1998, and entitled "GIGABIT ETHERNET TRANSMITTER," 60/107,702, filed Nov. 9, 1998, and entitled "ETHERNET GIGABIT ANALOG SYSTEM," and 60/108,001, filed Nov. 11, 1998, and entitled "ADAPTIVE ELECTRONIC HYBRID LINE DRIVER FOR GIGABIT ETHERNET, the entire contents of which are hereby expressly incorporated by reference.

BACKGROUND OF THE INVENTION

The present invention relates to transmission systems for transmitting analog data on an unshielded twisted pair (UTP) of wires. More specifically, this invention is directed to an integrated gigabit Ethernet transmitter.

The past few years has witnessed an almost exponential growth in the extent of high speed data networks, and the data transmission speeds contemplated over such networks. In particular, bidirectional data transmission in accordance with the various Ethernet network protocols, over unshielded twisted pair (UTP) wiring, has emerged as the network implementation of choice for general commercial LAN installations as well as for some of the more prosaic residential and academic applications.

Local Area Networks (LAN) provide network connectivity for personal computers, workstations and servers. Ethernet, in its original 10BASE-T form, remains the dominant network technology for LANs. However, among the high speed LAN technologies available today, Fast Ethernet, or 100BASE-T, has become the leading choice. Fast Ethernet technology provides a smooth, non-disruptive evolution from the 10 megabits per second (Mbps) performance of the 10BASE-T to the 100 Mbps performance of the 100BASE-T. The growing use of 100BASE-T connections to servers and desktops is creating a definite need for an even higher speed network technology at the backbone and server level.

The most appropriate solution to this need, now in development, is Gigabit Ethernet. Gigabit Ethernet will provide 1 gigabit per second (Gbps) bandwidth with the simplicity of Ethernet at lower cost than other technologies of comparable speed, and will offer a smooth upgrade path for current Ethernet installations. With increased speed of Gigabit Ethernet data transmission, it is evident that EMI emission and line reflections will cause the transmitted signal to become substantially impaired in the absence of some methodology for filtering the transmitted data.

Therefore, there is a need for an integrated transmitter in a data transmission system for pulse shaping digital input data and reducing EMI emissions, implemented with relatively simple circuitry.

SUMMARY OF THE INVENTION

The aforementioned need in the art for an integrated transmitter is addressed by a transmitter that is power efficient and has reduced electromagnetic interference (EMI) emissions for unshielded twisted pair (UTP) data communication applications. Transmit data is processed by a digital filter. The digital filter is integrated with a DAC binary decoder in a memory device such as a read-only memory (ROM) with time multiplexed output. The digital filter output data is converted to a current-mode analog waveform by a digital-to-analog converter (DAC). DAC line driver cells are adaptively configurable to operate in either a class-A or a class-B mode depending on the desired operational modality. A discrete-time analog filter is integrated with the DAC line driver to provide additional EMI emissions suppression. An adaptive electronic transmission signal cancellation circuit separates transmit data from receive data in a bidirectional communication system operating in full duplex mode. For a multi-transmitter system, timing circuitry staggers the time base of each transmitter to reduce the aggregate EMI emissions of the multi-transmitter system.

BRIEF DESCRIPTION OF THE DRAWINGS

The objects, advantages and features of this invention will become more apparent from a consideration of the following detailed description and the drawings in which.

DESCRIPTION

Figure 1:
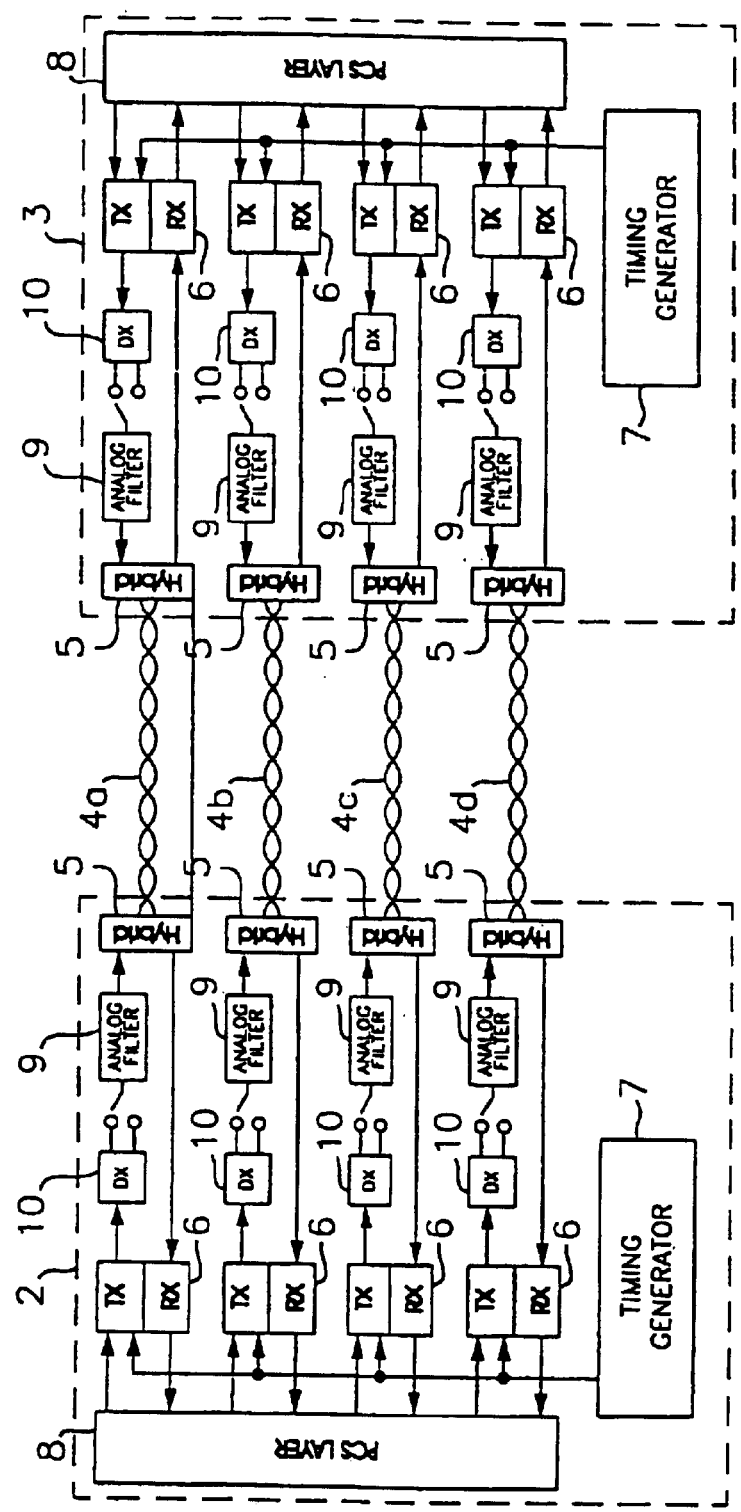
FIG. 1 is a semi-schematic simplified block diagram representation of a local and remote multi-transceiver system, in accordance with the present invention.

In many transmission system, the signal to be transmitted over a transmission line is processed and filtered to minimize signal distortion and Electromagnetic Interference (EMI) emission in the transmission line. Typically, this wave-shaping and filtering is carried out digitally for more accuracy. Therefore, the digital signal need to be converted to an analog signal, for transmission over the UTP transmission line, using a Digital-to-Analog Converter (DAC). Conventionally, digital signal processing and digital filtering is carried out separately and then, the "shaped" digital signal is converted to analog signal.

Generally, a DAC includes an array of output driver cells controlled by a DAC decoder. The DAC decoder generates control words responsive to the digital input. The control word controls each output driver cell by turning the current of a respective output driver ON or OFF. An analog signal is generated by connecting all of the outputs of the driver cells. This method generally requires additional circuits and special logic circuits for implementing the DAC decoder and re-synchronization logic to re-synchronize the bits in a control word for driving all of the output driver cells at the same time. The requirement for these additional circuits becomes even more significant and problematic in an Integrated Chip (IC) where silicon area is expensive. It would be beneficial, both to circuit performance and to manufacturing economies, if the digital filter and the DAC decoder in a data transmission system can be integrated in a memory device such as a Read-Only Memory (ROM).

Furthermore, a conflict arises when it is recognized that radiative emissions are reduced when a differential signal transmitter, such as an Ethernet transmitter, is transmitting a differential signal in what is termed Class-A mode, i.e., the differential mode current varies in order to define the signal, while the common-mode current component is kept constant. However, constant common-mode current compels such circuitry to conduct a constant quanta of current at all times, even when the differential mode signal defines a zero value. It is well understood that current mode transmitters, outputting a constant common-mode current, necessarily consume relatively large amounts of power, caused by constant conduction of the output section. It is further understood that in order to minimize constant current conduction and thus power consumption, a differential signal system could be operated in what is termed a Class-B mode, i.e., one in which the common-mode current is allowed to vary between some maximum value and zero. However, when operating in Class-B mode, the variable common-mode current causes the very radiative emissions that one would seek to avoid in a high density installation.

It is beneficial, therefore, both to circuit performance and to manufacturing economies, if an Ethernet-capable transceiver includes a transmitter or transmit DAC that was adaptively configurable to operate as a cross-standard transmitter platform, as well as being adaptively configurable between Class-A and Class-B operational modes, depending on the intended installation. Such a circuit provides the industry with a single-chip solution having such flexibility that it is able to be incorporated into high density systems where emissions are a problem, as well as low density systems where power consumption is the greatest concern. Such a single-chip solution is able to communicate with other Ethernet installations regardless of the communication standard chosen.

As the number of available communication channels increases, more transmitters need to be integrated in an IC chip or in a Printed Circuit Board (PCB). With increasing speed of circuits and clock rates, it is evident that EMI emission will cause the transmitted signal to become substantially impaired in the absence of some methodology to reduce the emission.

The output spectrum of a differential current-mode transmission line driver includes signal harmonics radiating from commonly employed transmission media such as UTP cable. A transmission line driver, even with filtering, includes these signal harmonics having substantial power density. The harmonics have images of the baseband signal centered around the integer multiple frequencies of the interpolation rate N. For example, for an input data rate of 1/T, the harmonics are centered around 1*N/T, 2*N/T, 3*N/T. The differential energy produced from these images is converted to common-mode energy by the finite differential-to-common-mode conversion in the magnetic and UTP medium. The transmitted common-mode energy is the primary source of EMI emissions for data communication applications. These EMI emissions may generate crosstalk between system components or cause errors in data transmission.

The first set of images around N/T is the highest of the images and is the major contributor to EMI emissions. For example, images of the baseband signal in 10Base-T transmission medium with a 20 MHz transmission rate and interpolation rate of 8 are centered around 160 MHz, 320 MHz, 480 MHz, . . . . The highest image is centered around 160 MHz and significant baseband energy is located at 150 MHz and 170 MHz (i.e. 160 MHz+/−10 MHz).

This EMI emission becomes even more significant and problematic in data transmission systems such as IC chips that integrate several transmitters in a single chip. In these applications, a further filtering of the output waveform is required in order to meet the Federal Communications Commission (FCC) emission requirements that limit the magnitude of signal harmonics which may be radiated by a given product.

It is known in the art that EMI emissions induced by a transmitter in a data transmission system can be reduced a by cancellation circuit for generating a cancellation signal to produce electromagnetic fields which are opposites of the fields produced by the transmitters. This method generally requires additional circuits for adjusting the phase and amplitude of the cancellation signal. Thus, the method is costly and cumbersome, specially, for data transmission systems that include multiple transmitters.

It would be beneficial, both to circuit performance and to manufacturing economies, if the EMI emission in a multi-transmitter system is reduced, without the need for complex and costly cancellation circuitry. Such EMI reduction can be accommodated by circuitry resident on a multi-transmitter chip or on a multi-transmitter PCB.

Moreover, it is known in the art that emission induced by a transmission line can be reduced by wave shaping employing digital filtering methods. The effectiveness and pulse shaping quality of a digital filter depend on its interpolation rate. However, the higher the interpolation rate, the more complex the digital filter gets. Thus, utilizing a combination of a simpler digital filter with a lower interpolation rate and an analog discrete-time filter, instead of a more complex digital filter with twice the interpolation rate of the simpler digital filter, achieves similar performance resulting in a significant reduction in digital filter complexity and size. In an IC implementation, the reduction of the interpolation rate of the digital filter, results in significant decrease in silicon area and power consumption of the transmitter.

Additionally, the latest high-speed Ethernet protocols contemplate simultaneous, full bandwidth transmission, in both directions (termed full duplex), within a particular frequency band, when it is desirable to maximize transmission speed. However, when configured to transmit in full duplex mode, it is evident that the transmitter and receiver sections of a transceiver circuit must be coupled together, in parallel fashion, at some transmission nexus short of twisted pair transmission channel.

Because of the nexus coupling together of the transmitter and receiver, it is further evident that the simultaneous assertion of a receive signal and a transmit signal, on the transmission nexus, will cause the receive signal to become substantially impaired or modified in the absence of some methodology to separate them.

Standard arrangements for achieving this isolation or transmit/receive signal separation in the prior art include complex hybrid circuitry provided as a separate element external to an integrated circuit transceiver chip. Hybrids are generally coupled between the transmit/receive signal nexus (the channel) and the transmit and receive signal I/Os. In addition to excess complexity and non-linear response, hybrid circuits represent costly, marginally acceptable solutions to the transmit/receive signal separation issue.

It would be beneficial, both to circuit performance and to manufacturing economies, if a local transmit signal is separated from a receive signal, in full duplex operation, without the need for complex and costly hybrid circuitry. Such separation is accommodated by circuitry resident on an integrated circuit transceiver chip and in relative proximity to the signals being processed. Such separation is further performed in a substantially linear fashion, i.e., frequency independent, and be substantially immune to semiconductor process tolerance, power supply and thermal parameter variations.

The present invention might be aptly described as a system and method for an integrated data transmission system for pulse shaping digital input data, generating synchronized DAC control signals, and reducing EMI emissions in such a way to simplify the complexity of circuits and increase the flexibility of the system. The invention contemplates a memory device, such as a ROM, including data implementing the functions of a digital filter and the functions of a DAC decoder combined. DAC line driver cells are adaptively configurable to operate in either a class-A or a class-B mode depending on the desired operational modality. A discrete-time analog filter is integrated with the DAC line driver to provide additional EMI emissions suppression. An adaptive electronic transmission signal cancellation circuit separates transmit data from receive data in a bidirectional communication system operating in full duplex mode. For a multi-transmitter system, timing circuitry staggers the time base of each transmitter to reduce the aggregate EMI emissions of the multi-transmitter system.

FIG. 1 is a simplified block diagram of a multi-pair communication system that includes an integrated digital filter and DAC decoder (not shown), an adaptively configurable Class-A/Class-B circuitry 10, a discrete-time analog filter 9, an adaptive transmission signal cancellation circuitry 5, and a staggered timing generator 7 for EMI reduction, according to one embodiment of the present invention. The communication system illustrated in FIG. 1 is represented as a point-to-point system, in order to simplify the explanation, and includes two main transceiver blocks 2 and 3, coupled together with four twisted-pair cables. Each of the wire pairs is coupled between respective transceiver blocks and each communicates information developed by respective ones of four transmitter/receiver circuits (constituent transceivers) 6 communicating with a Physical Coding Sublayer (PCS) block 8.

Each transmitter circuit is coupled to a respective wire pair transmission media. Although FIG. 1 illustrates a single driver circuit corresponding to a respective twisted wire pair, the illustration is simplified for ease of explanation of the principles of the invention. It should be understood that the transmitter within each transceiver 6 represents a multiplicity of differential output cells, the sum of which defines the physical signals directed to the transmission medium.

The functions of a digital filter, a DAC decoder, and a re-synchronization logic are combined in a memory device, such as a ROM. The timing generator circuit 7 provides timing references for a multiplexer and the respective control logic for time multiplexing the output of the memory device. This allows a transmitter system, constructed according to the present invention, to operate most efficiently in a reduced circuit complexity and silicon area.

Adaptively configurable Class-A/Class-B circuitry 10 allows for selective low-power and/or high-speed operation. A selection circuit asserts control signals that adaptively configure each signal component output circuit to operate in Class-A, Class-B, or a combination of Class-A and Class-B mode.

An analog discrete-time filter 9 is implemented for reducing EMI emission at the output of the transmitter. In one embodiment, timing generator circuit 7 generates timing signals for dividing each digitized input data sample into a first time segment and a second time segment. A control logic connected to the output cell generates control signals to drive the output cell to produce half of the current-mode differential output signal for the first time segment and the full current-mode differential output signal for the second time segment.

A transmit signal cancellation circuit 5 is electrically coupled to the receive signal path, and develops a cancellation signal, which is an analogue of the transmit signal, and is asserted to the receive signal path so as to prevent the transmit signal from being superposed on a receive signal at the in-put of the receiver.

The timing signals for each transmitter are staggered in time for predetermined time intervals to reduce aggregate electromagnetic emission caused by signal images centered around integer multiples of frequency Fi of the four transmitters. Each transmitter circuit is coupled to a timing generator circuit 7 which provides the required timing for the respective transmitter in accordance with the present invention.

Figure 2:
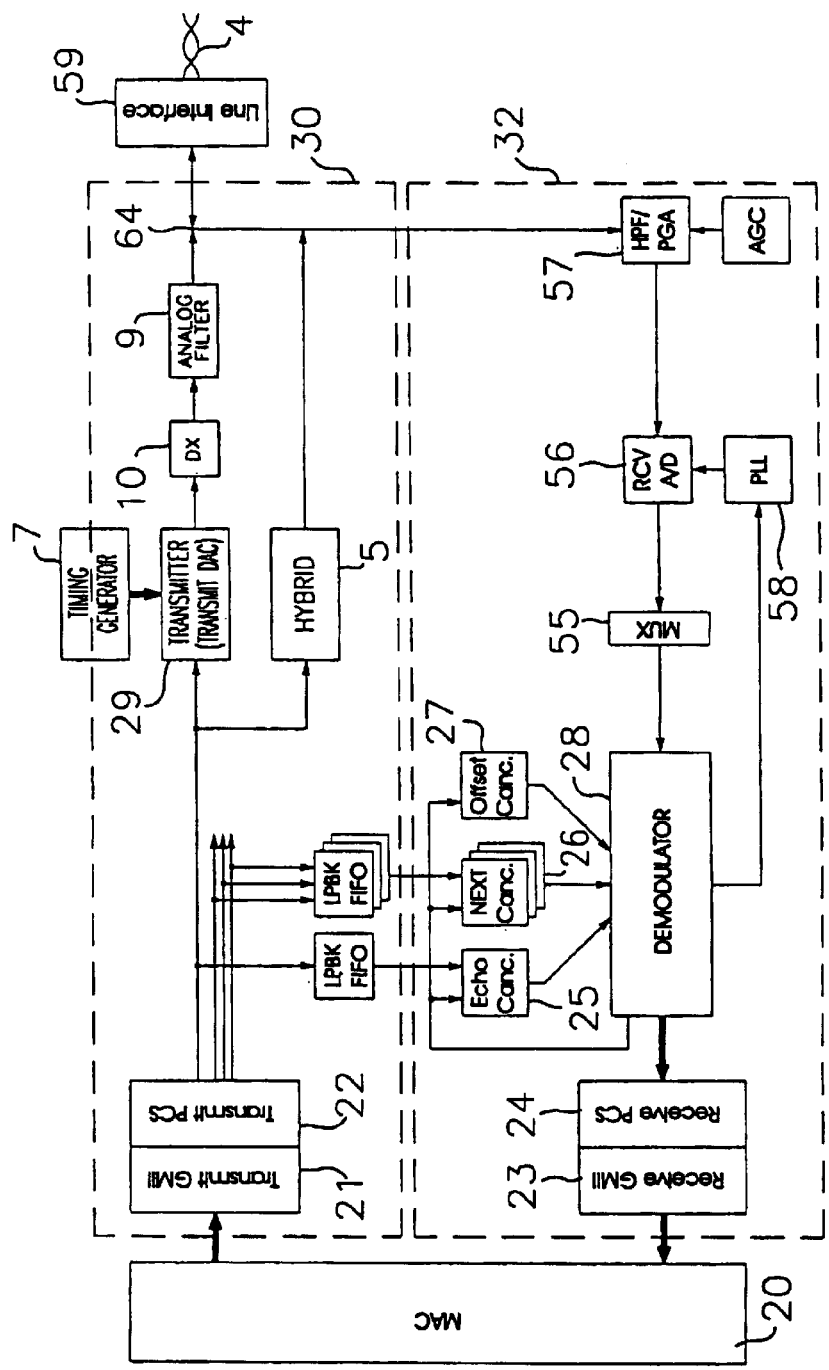
FIG. 2 is a semi-schematic, simplified block diagram of a transceiver, adapted for bi-directional communication, in accordance with the present invention.

FIG. 2 is a simplified block diagram of one implementation of a transceiver system, adapted for full-duplex communication, the arrangement of which might be pertinent to an understanding of the principles of operation of the present invention. The exemplary transceiver of FIG. 2 encompasses the physical layer (PHY) portion of a transceiver and is illustrated as including a transmitter section 30 and a receiver section 32, coupled between a media access layer (MAC) 20 and a communication channel; in this case, represented by twisted pair wiring 4, also termed unshielded twisted pair (or UTP) wiring.

The transceiver of the illustrated embodiment operates in accordance with a transmission scheme which conforms to the 1000BASE-T standard for 1 gigabit per second (Gb/s) Ethernet full-duplex communication over four twisted pairs of Category-5 copper cables. For ease of illustration and description, the embodiment of FIG. 2 depicts only one of the four 250 Mb/s constituent transceivers which are configured in parallel fashion and which operate simultaneously to effect 1 Gb/s in order to effect 1 Gb/s communication. Where signal lines are common to all four of the constituent transceivers, they are rendered in a bold line style. Where signal lines were laid to a single transceiver, they are rendered in a thinner line style.

Received analog signals are provided to the receiver section 32 where they may be pre-conditioned by filter/amplification circuitry 457, such as a high-pass filter (HPF) and programmable gain amplifier (PGA), before being converted to digital signals by a receive analog-to-digital converter (ADC) 56 operating, for example, at a sampling rate of about 125 MHz. ADC timing is controlled by the output of a timing recovery circuit 58 which might be configured as a phase-lock-loop (PLL) or some other feed-back controlled circuitry configured for determinable periodic operation.

Digital signals, output by the receive ADC 56, along with the outputs from the receive ADCs (not shown) of the other three constituent transceivers, are input to a pair-swap multiplexer circuit (MUX) 55 which functions to sort out the four input signals from the four ADCs and direct each signal to its respective appropriate demodulator circuit for demodulation and equalization. Since the coding scheme for gigabit communication is based on the premise that signals carried by each twisted pair of wire correspond to a 1-dimensional (1D) constellation and that the four twisted wire pairs collectively form a 4-dimensional (4D) constellation, each of the four twisted wire pairs must be uniquely identified to a particular one of the four dimensions in order that decoding proceed accurately. Any undetected and uncompensated swapping of wire pairs would result in erroneous decoding. The pair swap MUX 55 maps the correct input signal to the demodulation circuit 28.

Demodulator 28 functions to demodulate the receive digital signal and might also provide for channel equalization. Channel equalization might suitably include circuitry for compensating the inter-symbol-interference (ISI) induced by partial response pulse shaping circuitry in the transmitter section of a remote gigabit capable transceiver, which transmitted the analog equivalent of the digital receive signal. In addition to ISI compensation, the demodulation also compensates for other forms of interference components such as echo, offset and near end cross-talk (NEXT) by subtracting corresponding cancellation vectors from the digital receive signal. In particular, an offset cancellation circuit 27 generates an estimate of the offset introduced at the transceiver's analog front end (including the PGA and ADC).

Three NEXT cancellation circuits, collectively identified as 26, model the near end cross-talk impairments in the receive signal caused by interference between the receive signal and the symbols (signals) sent by the transmitter sections of the other three local constituent transceivers. Since the NEXT cancellation circuits 26 are coupled to the transmit signal path, each receiver has access to the data transmitted by the other three local transmitters. Thus, NEXT impairments may be replicated by suitable filtering. By subtracting the output of the NEXT cancellation circuits 26 from the receive signal, NEXT impairments may be approximately canceled.

Following echo, NEXT and offset cancellation, receive signals are decoded (by a trellis decoder, for example) and provided to a receive Physical Coding Sublayer (PCS) lock 24 and thence to he media access layer (MAC) 20 through a media independent interface circuit (GMII) 23.

In transmit operations, transmit signals are provided by he MAC 20 to a transmit PCS block 22 through a transmit GMII circuit 21. In the case of gigabit Ethernet transmissions, coded signals might be processed by a partial response pulse shaping circuit (not shown) before being directed to a transmit digital-to-analog converter (TXDAC) 29 for conversion into analog signals suitable for transmission over twisted pair wiring 4 to a remote receiving device through line interface circuitry 59.

The exemplary transceiver system of FIG. 2 has been described in the context of a multi-pair communication system operating in conformance with the IEEE 802.3 standard (also termed 1000BASE-T) for 1 gigabit Ethernet full-duplex communication over Category-5 twisted pair wiring. However, and in accordance with the present invention, the exemplary transceiver is further configurable for operation in conjunction with 10BASE-T, 100BASE-T and 100BASE-Tx performance standards. In particular, the transmitter 29 is configurable to accommodate both 1.0 volt output swings characteristic of Tx and the 2.5 volt output swings characteristic of 10BASE-T operation.

Bidirectional analog signals are transmitted to and received from a 2-wire transmission channel 4 through line interface circuitry 59. In the illustrated transceiver system of FIG. 2, both the transmitter 30 and receiver 32 are coupled to the transmission channel 4 through the line interface circuitry 59 such that there is a bidirectional signal path between the transceiver and the interface circuit 59. This bidirectional signal path splits into a receive signal path and a transmit signal path at a nexus point 64, at which point both transmit and receive signals are present during full duplex operation. Transmit signals, present on the nexus 64, are isolated from the receive ADC 56 by a transmit signal cancellation circuit 5 which is coupled between the bidirectional signal nexus and the receiver's analog front end.

In a manner to be described in greater detail below, transmit signal cancellation circuitry 5 functions to evaluate signals appearing on the receive signal line and condition those signals such that any transmit signal components are removed from the receive signal line prior to the receive signal's introduction to the analog front end and the receive ADC 56. Further, such conditioning does not perturb any components of the transmit signal prior to the signal's introduction to the channel. Transmit signal cancellation circuitry 5 is connected to receive, and is operatively responsive to, the digital transmission signal directed to the transmit DAC 29 by the pulse shaper 22. Since the cancellation circuit 5 operates in response to the same digital transmission signal as a transmit DAC 29, the cancellation circuit 5 is able to develop a conditioning or cancellation signal which substantially directly corresponds to the analog transmission signal produced by a transceiver's transmit DAC.

In general terms, any analog intelligence signal, whether in baseband or passband, may be processed by the cancellation circuit 5 for full duplex communication over any transmission channel. However, the intelligence signal characteristics are effectively canceled at the inputs of the receive ADC 56 such that full duplex communication can occur without a transmitter's intelligence-signal swamping a receive signal that might have been communicated over a generally lossy channel, characterized by a relatively poor noise margin or signal-to-noise ratio (SNR). The transmit intelligence signal is conditioned prior to its being directed to the transmission channel, thus allowing the system to operate on a cleaner signal, resulting in a cleaner, more effective and precise signal suppression characteristic at the receive end of the nexus.

In other words, the cancellation circuit 5 is positioned at a nexus junction of a bi-directional transceiver's transmit block, receive block and transmission channel buffer circuitry, as represented by a line interface circuit. The cancellation circuit operates upon transmit signals appearing on the nexus so as to allow substantially unperturbed passage of analog transmit signals to the channel side of the nexus, while restricting passage of analog transmit signals to the receive side of the nexus such that receive signals can be processed by the analog front end unimpaired by superposed components of transmit signals.

Timing circuit 7 generates the required timing for the plurality of transmitters. In a manner to be described in greater detail below, each transmitter 29 is constructed to include a digital-to-analog converter (DAC) with an array of output driver cells, with individual cells making up the array able to be adaptively included or excluded from operation in order to define a variety of characteristic output voltage swings. The individual output driver cells are controlled by a DAC decoder. Responsive to the value of the digital input, the DAC decoder generates a DAC control word that controls which sets of output cells are turned on and which sets are turned off.

The output current of the DAC is generated by an array of identical line driver cells, each with respective driver controls coming from a DAC decoder. For each value of the digital input, the DAC decoder generates a control word. Depending on the DAC control words, these driver cells are either turned on or turned off. For each digitized sample of the input, the output currents of all the line driver cells are added together to produce an analog representation of the digital input. The number of line driver cells is chosen to meet the resolution requirement of the DAC. Each line driver cell has high output impedance, such that the transmit output impedance of the transmitter is determined by an external resistor. All driver cells have topologically identical circuit design, so each transmitter line driver can achieve accurate and linear output current levels.

Figure 3:
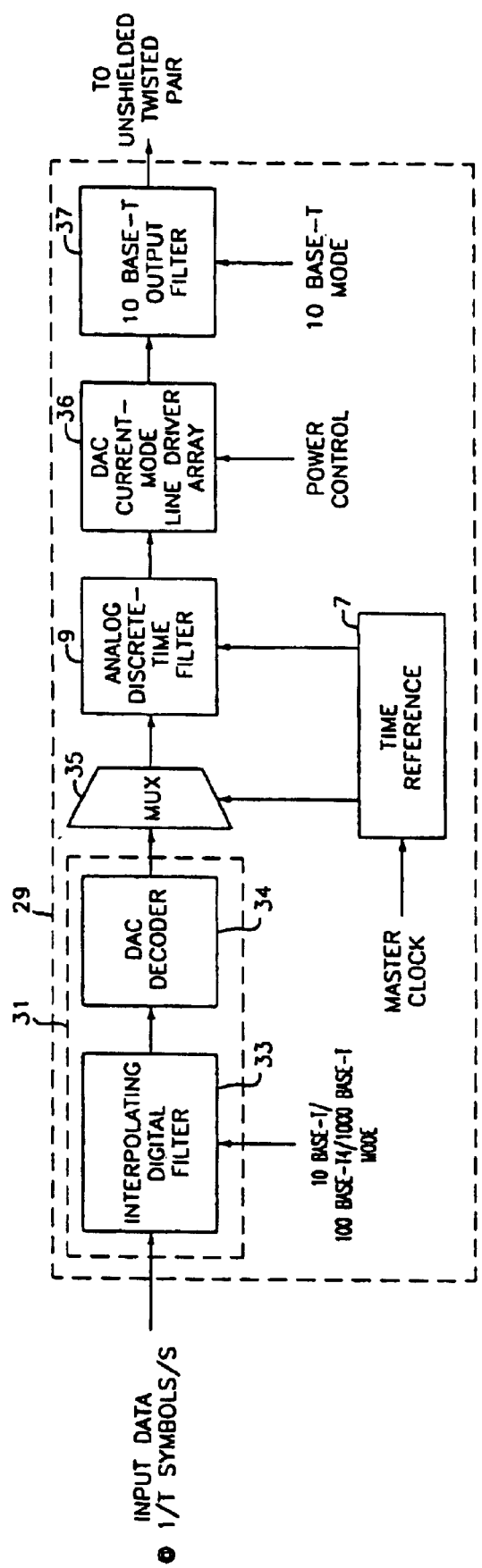
FIG. 3 is a semi-schematic, simplified block diagram of the configurable transmit DAC of FIG. 2.

FIG. 3 shows one embodiment of a transmitter 29 architecture. The transmitter includes an interpolating digital filtering function for pulse shaping of the transmit signal to reduce the EMI emission caused by the transmission line. Pulse shaping includes modification of a signal spectrum by educing the sharp edges of the signal and is effective in lowering EMI emissions within a transmission system. A DAC (not shown as a separate block) converts the filtered digital output to an analog signal current.

Input digital data is fed to an interpolating digital filter 33. The filtered data then goes to a DAC binary decoder 34, which produces the DAC control words. Each bit in a control word controls an output driver cell by turning the current cell ON or OFF. The control words are directed to DAC current-mode line driver array 36 which includes a number of output driver cells. The outputs of all the current cells are added together to create the output analog signal. The number of driver cells is determined by the desired resolution of the DAC. The interpolating function of the digital filter 33 is integrated with the binary decoding function in a memory device, such as ROM 31. In other words, the functions of the digital filter and the DAC decoder are implemented as part of the ROM content. This ROM replaces digital filtering circuits, DAC decoding logic, and re-synchronization logic. When implemented in such manner, the logical implementation and memory replaces digital filtering circuits, DAC decoding logic circuit and re-synchronization logic circuits that are conventionally implemented in hardware. Thus, the hardware functionality of these circuits is rendered into arithmetic form and implemented in a memory device.

The output data of the ROM (filtered and decoded data) is selected by a multiplexer 35 that is synchronized employing a time reference 7. Re-synchronization logic that is usually needed at the output of a DAC decoder and is generally integrated with a DAC line driver in the art of DAC design is no longer needed because the DAC decoding function is performed in the ROM and is subsequently synchronized by the multiplexer 35. A stable and well-controlled timing reference 7 generates the control clocks and timing delays to the various blocks from a master clock.

The output of the multiplexer is further filtered by a discrete-time analog filter 9. The discrete-time analog filter is integrated with the DAC line driver array 36 to suppress high-frequency harmonics of the output transmit signal. Depending on the output of the multiplexer, a selected number of current drivers in the line driver array 36 are turned on to produce a current corresponding to the value of the filtered digital input signal. The line driver array produces a differential current output that drives the UTP line load. The line driver array 36 can be controlled for a power efficient operation using the adaptively configurable class-A/class-B circuit. In one embodiment of the present invention, an analog output filter 37 further processes the output signal from the line driver for smoother edges to further reduce the EMI emissions.

In one embodiment, the digital filter 33 is a Finite Impulse Response (FIR) filter. The output of a FIR filter is a weighted sum of the present and past input samples only, and is not a function of the output. To perform an interpolation function for wave shaping of the transmit signal, a weighted sum of the present and past input signals is calculated to produce the output of the filter. The weighted sum is determined by selection of filter coefficients. The order of the previous inputs that are taken into account for determining a present output is called the order of the filter.

Figure 4:
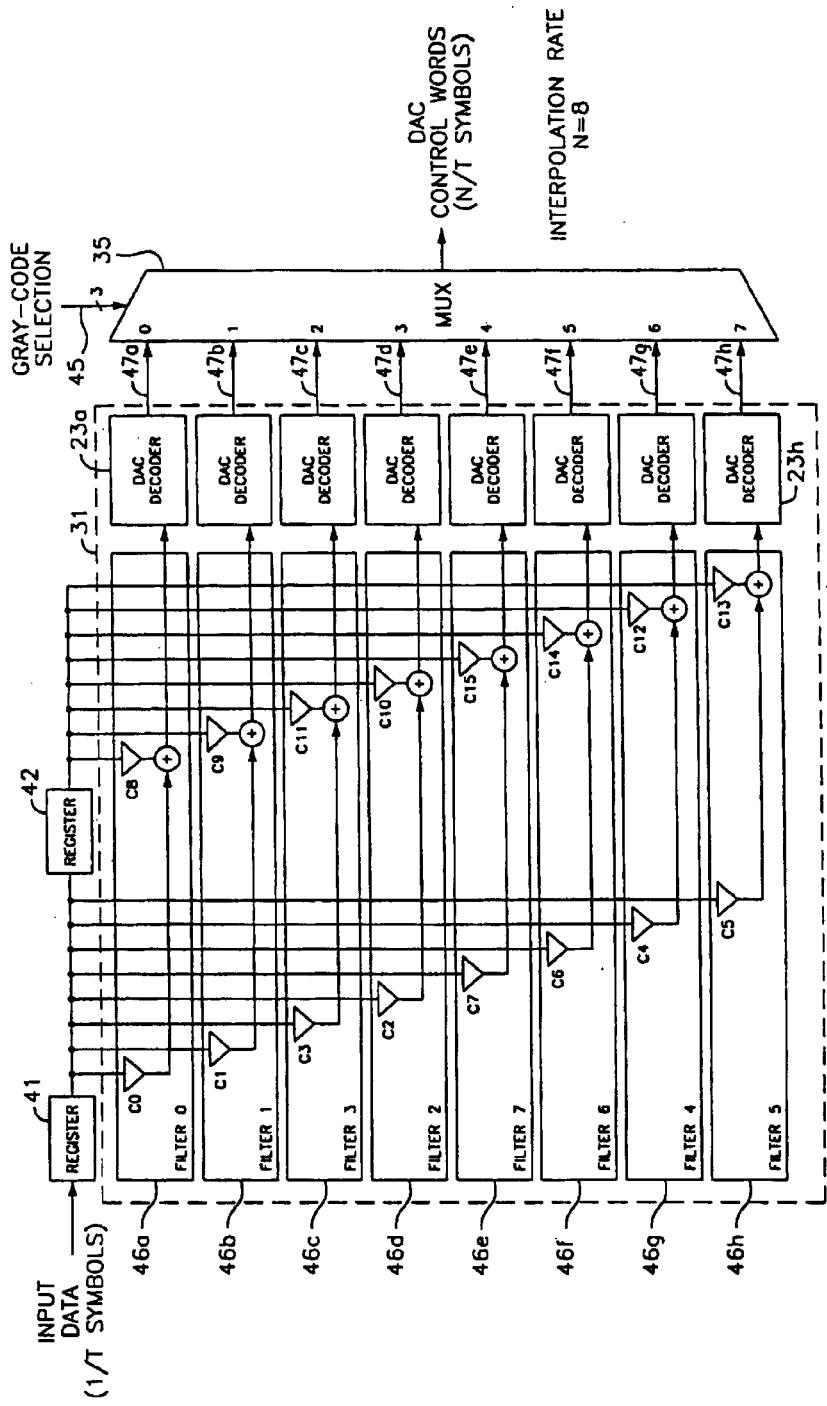
FIG. 4 is a simplified functional diagram of a ROM including an integrated digital filter and a DAC decoder.

FIG. 4 shows a functional diagram of the ROM 31 including the digital filter 33 and DAC decoder 34. The digital filter function is partitioned into N smaller digital filters 46a–46h which operate at the input data rate 1/T but are staggered by 1/Nth of the data period. In other words, with an interpolation rate N of eight, there are eight smaller digital filters. Each smaller filter is essentially a smaller ROM. Conceptually, the input data goes to two shift registers 41, 42 for an exemplary second order filter. For each smaller filter, the respective previous input data strings are multiplied by the respective filter coefficients C0–C15 and then added to generate the output for each smaller filter. The outputs of the smaller filters are fed to a respective DAC decoder 43a–43h. For example, in filter #0, the data strings are multiplied by the coefficients C0 and C8 and added before going to the DAC decoder 43a. Inside the ROM, the shift registers and the digital filters become selection circuits for selecting the respective ROM word. In one embodiment, the interpolation of the digital signal is performed by a functional twenty four order filter, implemented by eight functional third-order filters in a ROM including three shift registers.

Referring back to FIG. 4, the eight outputs of the digital filters 26a–26h are processed by eight binary decoders 43a–43h, which convert the outputs to DAC control words 47a–47h. The 8-to-1 multiplexer 35 selects one of the DAC control words at 8 times the data rate so, the multiplexer output rate is 8/T. For the example in FIG. 4, in 10Base-T, N is 8 and the DAC control word rate is 8 times 20 MHz or 160 MHz. The timing between the multiplexer selection control 45 and digital filter operation allows sufficient settling time for each filter and decoder combination.

For other interpolation rates N, there are N digital filters and N binary decoders to produce N control words. An N-to-1 multiplexer selects control words at N times the data rate to provide a multiplexer output rate of N/T.

The selection control and ordering of the digital filters follows a Gray code ordering which prevents glitches in the DAC control word because the selection only allows transitions to the proper subsequent filter. A Gray code is a binary code in which sequential numbers are represented by binary expressions, each of which differs from the preceding expression in one place only. In addition, the Gray coded selection control has the feature that no control bit lines are required to operate higher than half the multiplexer selection rate, i.e., 0.5*N/T. Since the DAC control word is synchronized by the multiplexer control selection, a bank of re-synchronization latches is not needed in the DAC. The eight filters in FIG. 4 are pictorially arranged to illustrate a Gray coding selection by the multiplexer 35.

The input data rate of the digital filter 33 is 1/T where T is, for example, 40 ns for 100Base-T4 and 50 ns for 10Base-T Ethernet communication lines. The input data is interpolated by the rate N. The interpolating digital filter produces output samples at N/T. The coefficients of the filter are chosen to meet the pulse shape requirement of the particular communication application. For example, in 10Base-T, the coefficients follow a linear filter which produces a 100% raised cosine response after it has been filtered by a 100 meter UTP line model. In 100Base-T4, the coefficients follow a linear filter which produces a 100% raised cosine response after it has been filtered by a third order Butterworth filter.

The digital filter is designed to meet the input signal requirements of a particular communication line. The coefficients of the filter are chosen by looking backwards to determine what values for the filter coefficients would produce the desired output signal. For example, a 100% raised cosine response is required in one embodiment for a 10Base-T transmission line and the filter coefficients are selected based on the transfer function of the transmission line and the required output. The filter results are then saved in a ROM as look up tables. In other words, the coefficients are used to determine the content of the ROM. The DAC decoder function is integrated and saved in the same lookup table in the ROM, along with the coefficients of the digital interpolating filter. As a result, every word of the ROM includes all the functions for computing the filter output as well as all the functions for decoding the DAC. This technique not only eliminates the need for a separate digital filter circuit, but also eliminates the need to re-synchronize the output of the DAC decoder before it goes to a DAC driver cell.

Figure 5:
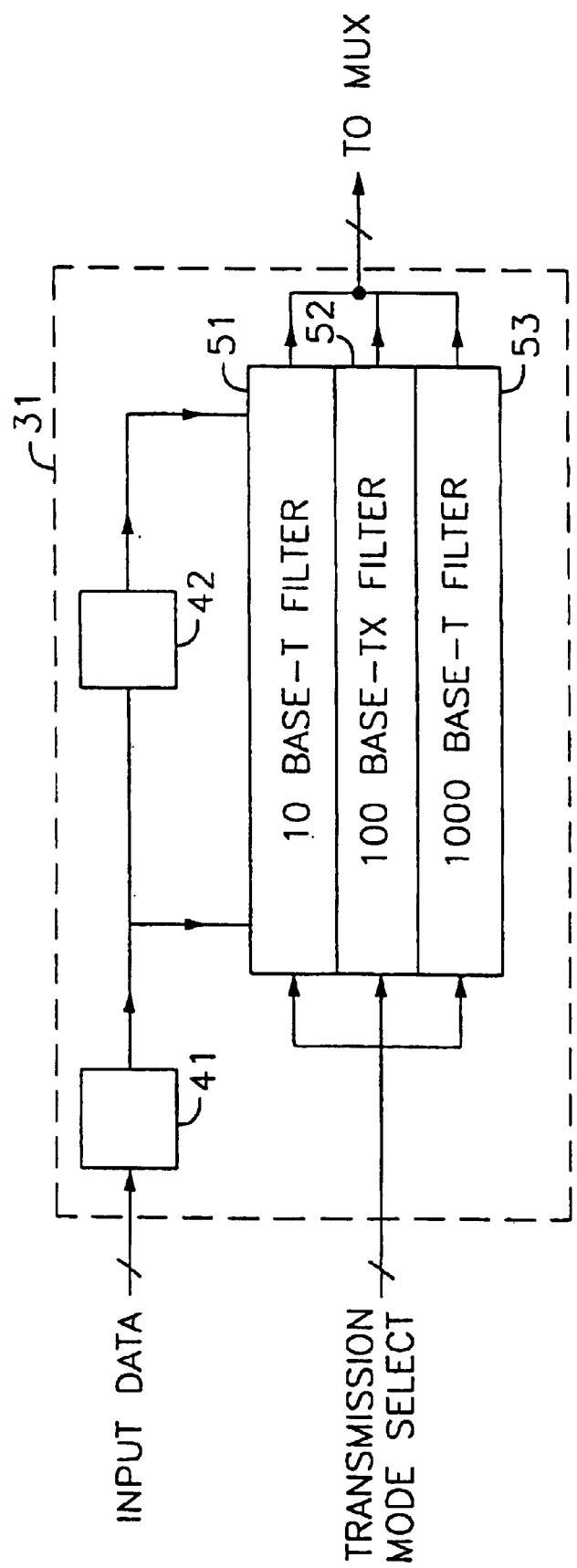
FIG. 5 is a simplified block diagram of a multiple ROM embodiment.

A phase-locked loop (PLL) is used to generate the required timing signals (time reference 7) for outputting the right data at the right time from the ROM. A transmitter that supports multiple communication applications such as a 10Base-T, 100Base-T4/TX/T2, or 1000Base-T product, requires different digital filtering (e.g., different values for the filter coefficients). Thus, multiple smaller ROMs (digital filters) are implemented, but only the output from the appropriate smaller ROM is selected by using a transmission mode control signal. FIG. 5 shows an exemplary embodiment for 10Base-T, 100Base-TX, and 1000Base-T communication modes. Depending on the transmission mode, a mode select control selects one of the three smaller ROMs 51, 52, or 53, and the output of the selected ROM goes to the multiplexer. The two other smaller ROMs that are not selected are inactive and thus disconnected from the output line.

Figure 6:
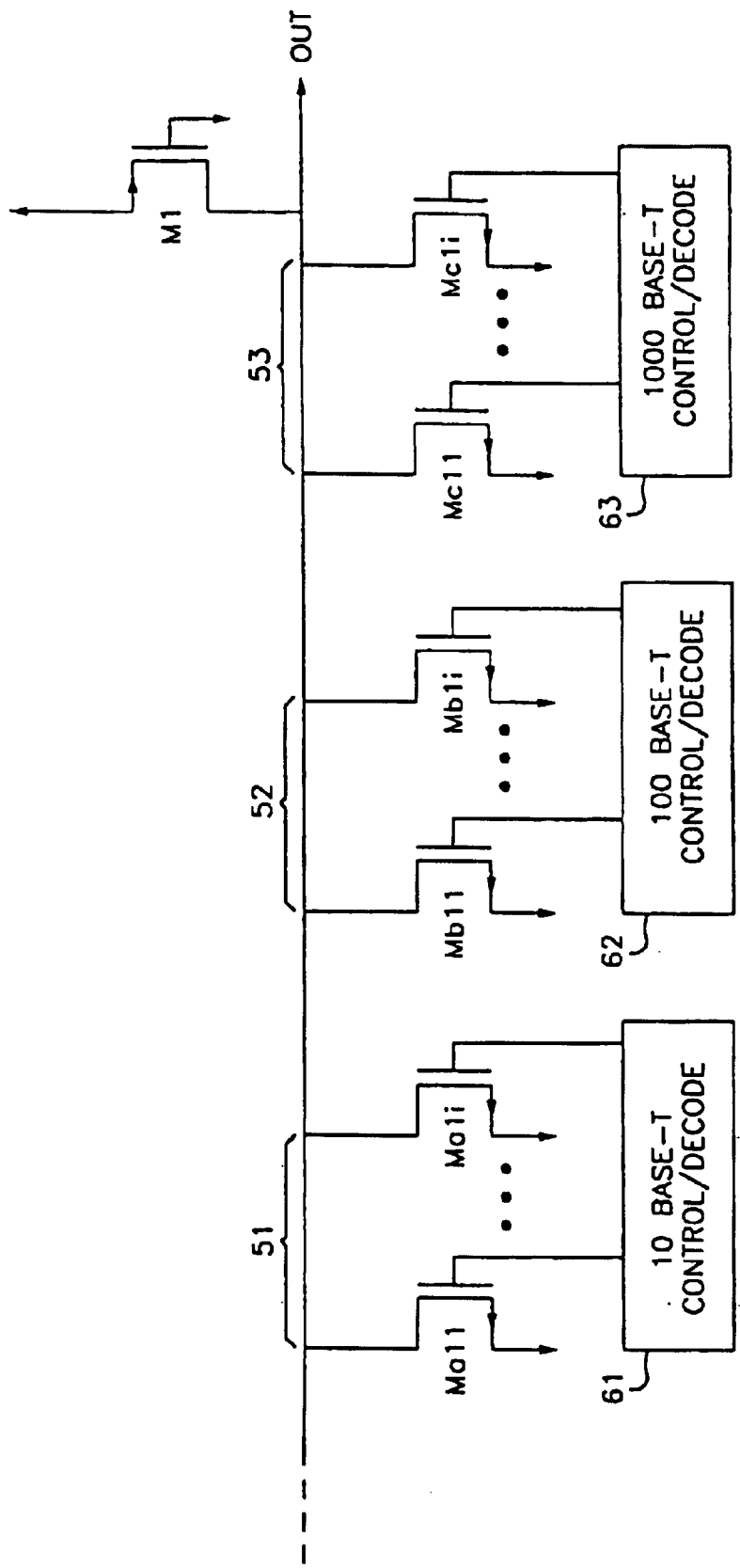
FIG. 6 is a semi-schematic simplified block diagram of a multiple ROM embodiment.

There are as many rows in each smaller ROM as there are bits in the ROM word. For example, a ROM word of j bits has j rows. Also, there are i words stored in each smaller ROM. Referring now to FIG. 6, when the 10Base-T mode is selected, ROM 51 is active and ROMs 52 and 953 are inactive and disconnected from the output line. Specifically, all the MOSFETs, Mbij and Mcij, are off and thus are floating. Depending on the content of the ROM 51, the 10Base-T control 61 may turn on one of the MOSFETs Mall-Mali in row 1, resulting in a low logic level at the output. The MOSFETs in other rows of the ROM would be open or closed accordingly as required by the ROM word.

Figure 7:
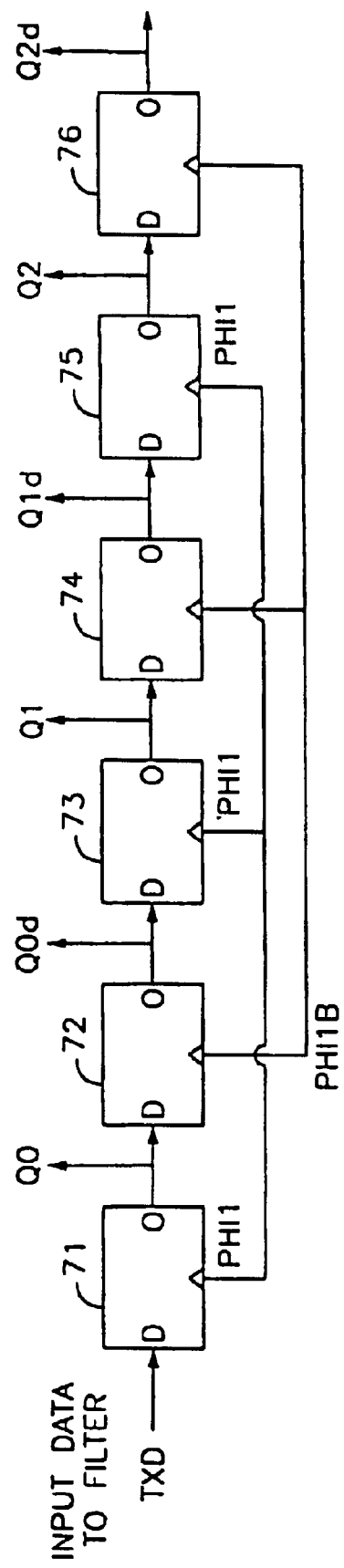
FIG. 7 is a simplified block diagram of a ROM decoder.

FIG. 7 illustrates one embodiment of the ROM control logic for a three-tap filter implementation. The input data is shifted by three shift registers 71, 72, and 73 that are clocked by PHI1 running at 40 MHz to produce the ROM control signals Q0, Q1, and Q2. However, three more shift registers 72, 74, and 76 that are clocked by PHI1B (PHI1 inverted) are used to generate three more ROM control signals Q0*d*, Q1*d*, and Q2*d*. These two sets of ROM control signals, one set delayed in time, are used to generate the two halves of a ROM word at two different times. This technique ensures that there is sufficient time for settling of the ROM data at the input of the multiplexer 35.

Figure 8:
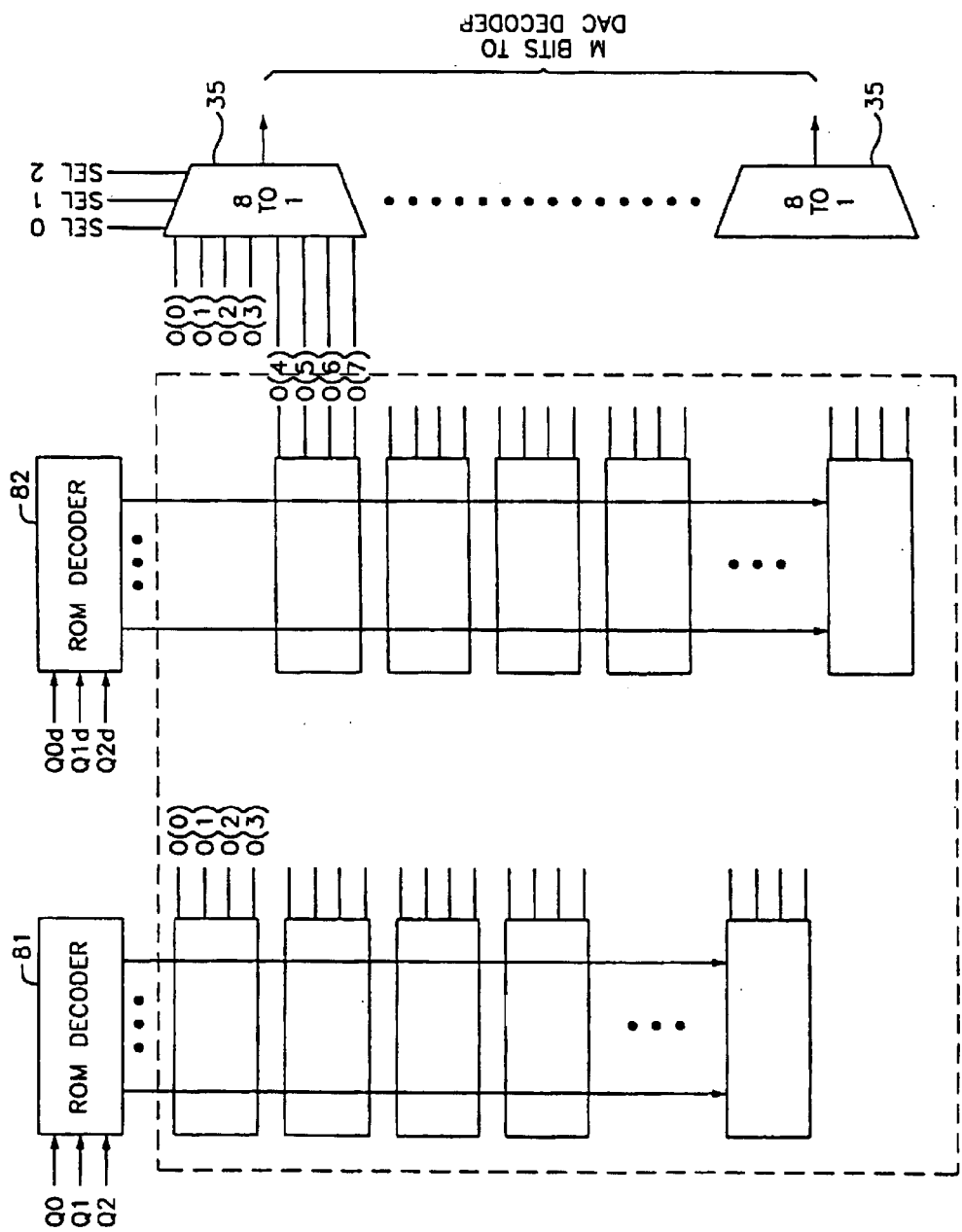
FIG. 8 is a simplified block diagram of a ROM arrangement.

Each smaller ROM included in the ROM 31 can be organized as several ROM arrays, each ROM array having a different timing for outputting the ROM data. As shown in FIG. 8, each smaller ROM is divided into two ROM arrays. The first ROM array contains data cells for the first half of each ROM word (O(0-3)) and is controlled by the ROM decoder 81 that uses Q0-Q2 control signals. The second ROM array contains data cells for the second half of each ROM word (O(4-7)) and is controlled by the ROM decoder 82 that uses Q0*d*–Q2*d* control signals. Thus, O(0-3) are synchronized to PHI1 and O(4-7) are synchronized to PHI1B to ensure sufficient data settling time. The 8-to-1 multiplexer 35 selects each of the ROM word bits O(0–7) based on a Gray code ordering to ensure further integrity of the signals going to the DAC decoder.

Figure 9:
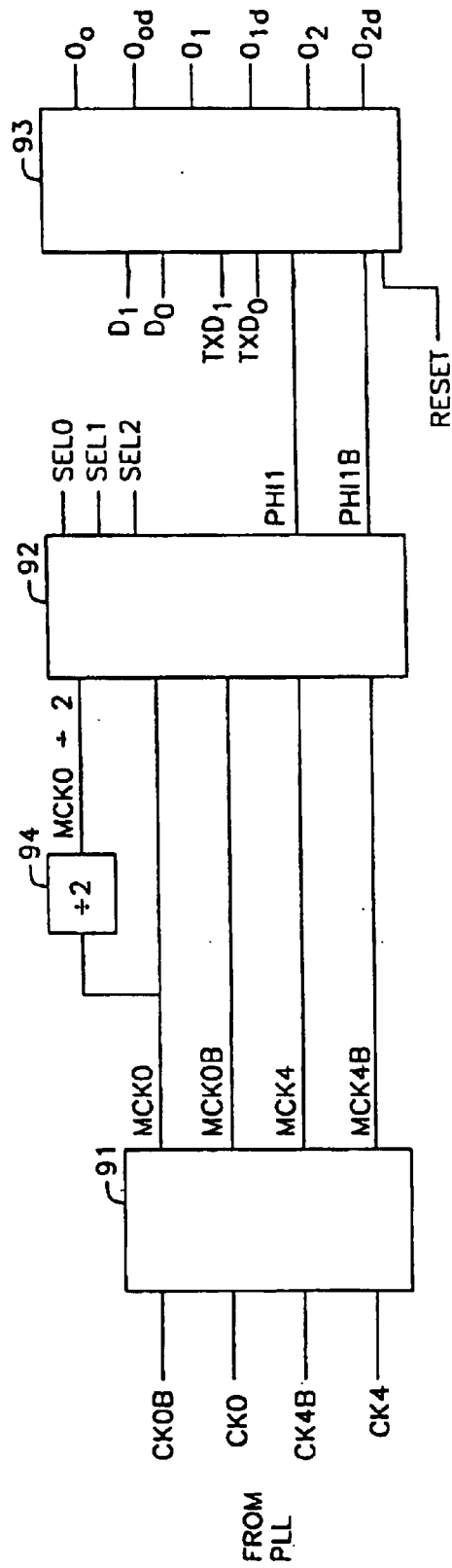
FIG. 9 is a semi-schematic simplified block diagram of a ROM decoder and respective timing.

A block diagram of an exemplary ROM decoder and timing signals for a two bit input data for each transmitter is depicted in FIG. 9. Two clock phases CK0 and CK4 and their inversions CK0B and CK4B are generated from a PLL (shown in FIG. 11). These clock phases are buffered by an input clock buffer 91 before they are fed to an FIR clock generator 92. Based on clock phases MCK0 and its inversion MCK)B, and MCK4 and its inversion MCK4B, the clock signals PHI1 and PHI13 are generated by the clock generator 92. The clock signals PHI1 and PHI1B are used by the register 93 to generate Q0–2 and Q0*d*–2*d* ROM control signals. These control signals are hen fed to the ROM 31.

Figure 10:
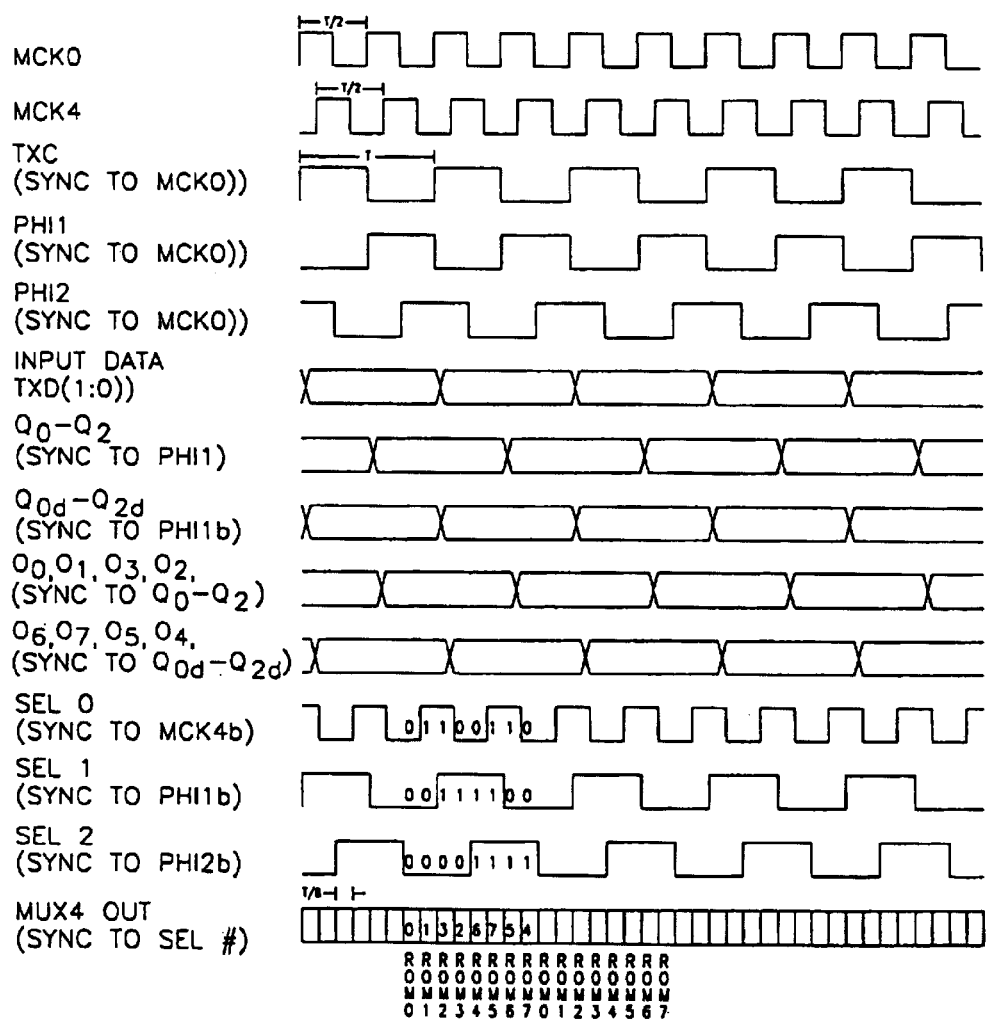
FIG. 10 is a simplified timing diagram for an integrated transmitter.

The timing diagram of the ROM 31 and the multiplexer 35, for an interpolation rate of eight, is shown in FIG. 10. The clock signal PHI1 is generated from clock phase MCK0 and is used to clock the input data to produce Q0–2 ROM control signals. PHI1B, the inversion of PHI1, is used to clock the input data to generate Q0*d*–2*d* ROM control signals. The ROM control signals Q0–2 are used to generate ROM outputs O(0-3) and Q0*d*–2*d* are used to generate ROM outputs O(4-7). Multiplexer select signals SEL0–2, following a Gray coding scheme, are used to multiplex the ROM outputs at eight times the frequency of the MCK0.

Figure 11:
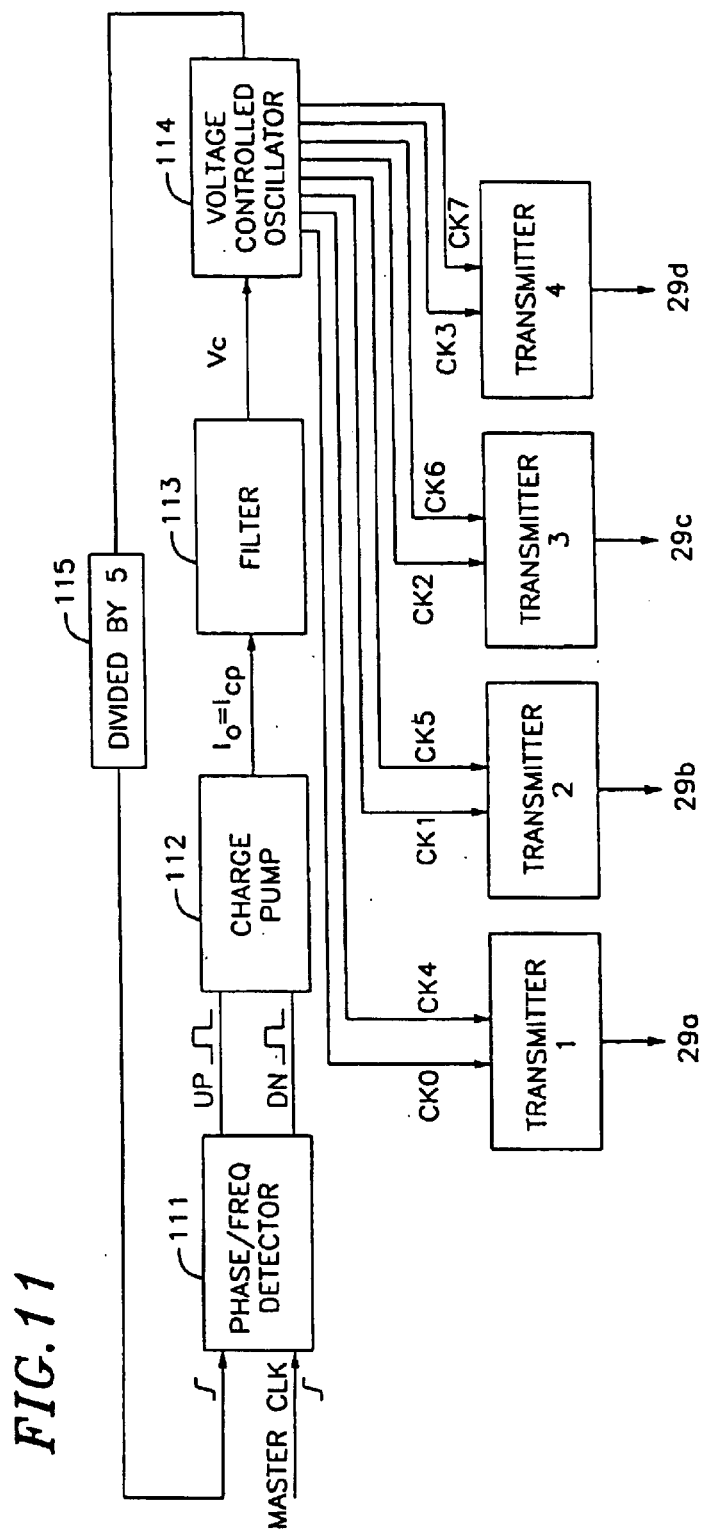
FIG. 11 is a simplified block diagram of one embodiment of a phase-locked loop.

The timing signals can be accurately generated by timing generator circuit, such as a PLL that includes a Voltage Control Oscillator (VCO). When a PLL is used as a frequency synthesizer, the VCO is divided down to a reference frequency that is locked to a frequency derived from an accurate source such as a crystal oscillator. FIG. 11 shows a PLL used for generating the required timing signals for one embodiment of the present invention. Phase detector 111 produces two periodic output signals as a function of the difference in the frequencies of its two input clocks. These two outputs are fed to a charge pump 112. The output of the charge pump 112 has a tri-state capability. Depending on which input is turned on, the output of the charge pump is a positive current source, negative current source, or an open circuit.

A filter 113 filters the high frequency components of the output of the charge pump before it is inputted to a VCO 114, in order to keep the VCO stable. The output of the VCO is divided by five (115) such that it locks to the crystal oscillator before it is fed back to the phase detector 111 as its first input. The second input of the phase detector is driven by a master clock. This way, clock signals at a multiple of the master clock are created. Selection and ordering of the DAC decoder output through the MUX follows a Gray-code selection criteria which prevents glitches in developed DAC control words because the selection criteria only allows transitions to proper decoder outputs.

Figure 12A:
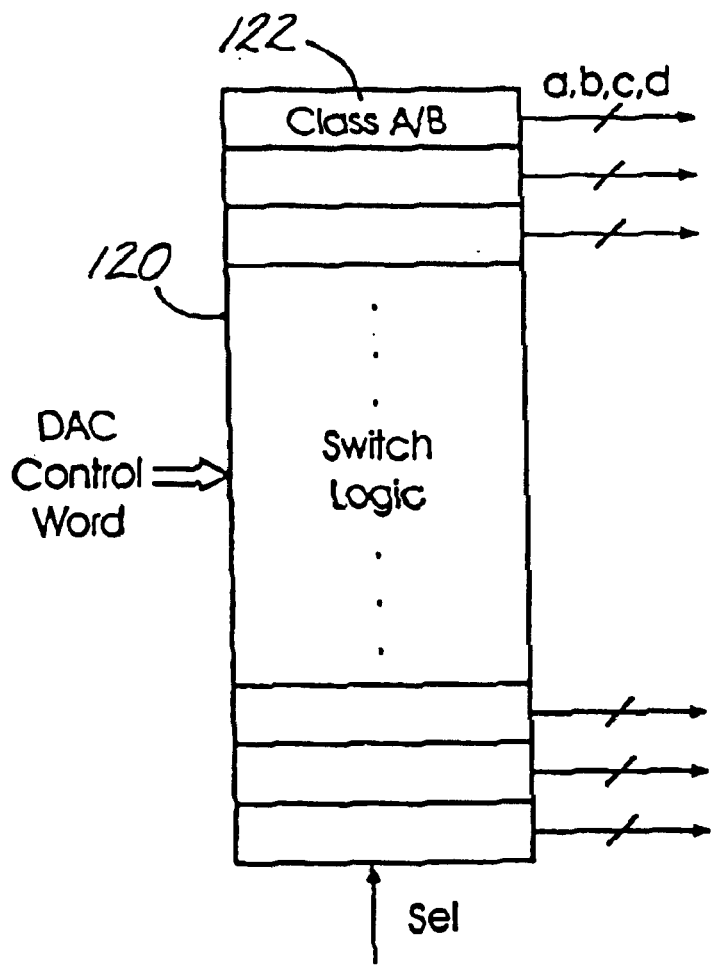
FIG. 12A is a semi-schematic block diagram of switch logic circuitry for controlling operation of a DAC line driver current cell array.

FIG. 12A is a semi-schematic block diagrammatic representation of Class-A/B switch logic circuitry 120, suitable for receiving a DAC control word and generating a plurality of line driver cell control signals, each set of control signals corresponding to a particular one of individual line driver cells making up a line driver array. DAC control words control operation of a Class-A/B switch logic circuit 120 which, in turn, provides activation signals to individual line driver cells making up a line driver array 122. Characteristically, the output current of a DAC is generated by an array of identical line driver cells which are turned-on or turned-off depending on the state of a particular DAC control word. For each input sample, output currents of all of the active line driver cells are added together at a summing junction to produce an analog representation of the original digital input. Control of individual driver cells and their operational mode (Class-A/B) is determined by "select" signals provided to the Class-A/B switch logic circuit 120. Necessarily, the number of the individual line driver cells implemented and their characteristic operational mode is chosen in order to meet the resolution requirements of the DAC as defined by the transmission standard.

For a transmitter that supports multiple communication standards such as 10BASE-T, 100BASE-T4/Tx/T2, 1000BASE-T, and the like, the number of individual driver cells making up the driver array will depend on the maximum, worst-case output voltage swing required by the transmission standards. In the exemplary embodiment, there are twenty-five individual current driver cells, each outputting a particular current quanta and for purposes of this specification, will be deemed normalized such that each of the twenty-five cells might be termed "full" cells. In addition, the line driver array 122 includes a "half" cell, so defined because the current quanta produced by that cell exhibits a value one-half the value of the current quanta output by the twenty-five "full" cells. Accordingly, depending upon the actual value of the current quanta and the load across which the output current is developed, full value output swings can be developed by the transmitter of the present invention in fifty equal-sized "half" steps by switching various combinations of "full" cells and the "half" cell into operation.

For example, in normal 10BASE-T operation, the output voltage swing defined by the standard is 2.5 volts. In order to accommodate this output voltage swing, all twenty-five cells, plus the "half" cell are used to develop the output. It will be understood by those having skill in the are that each of the twenty-five "full" cells develops a current sufficient to develop 0.10 volts across a load, with the "half" cell providing an additional degree of granularity to the output. Conversely, in 100BASE-Tx mode, the standard defines a 1.0 volt output swing. With driver cells configured to each develop 0.10 volts across a load, only ten cells are required from the line driver array in order to accommodate this output swing.

In FIG. 12A, the switch logic circuit 120 includes twenty-six Class-A/B control circuits 122 each of which defines whether their respective line driver cell is operable or non-operable and, if operable, whether each corresponding driver cell outputs a differential current in Class-A or Class-B mode. Each of the Class-A/B control circuits 122 defines four output signals a, b, c and d which, in a manner to be described further below, controls both operation and mode of each line driver cell. Control signals are asserted by each of the control circuits 122 in accordance with a select signal (SEL) asserted by the timing reference 7 of FIG. 3.

Figure 12B:
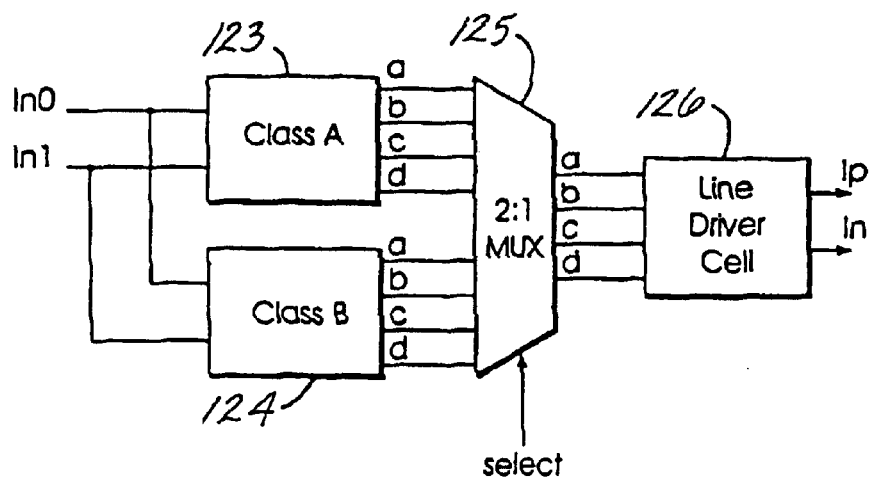
FIG. 12B is a semi-schematic simplified block diagram of switch logic circuitry and a line driver cell for a single current component.

Turning now to FIG. 12B, in one embodiment of the present invention, each current drive cell 126 is able to be controlled for either Class-A, Class-B, or a combination of Class-A and Class-B operation by selecting control signals a, b, c and d from either a Class-A driver control logic circuit 123 or a Class-B driver control logic circuit 124 by a 2:1 MUX 125. Determination of whether the line driver cell will be driven in Class-A or Class-B mode is made by a select signal that determines which of the control signals (a, b, c and d) will be selected by the MUX 125. Further, determination of the binary state of the control signals (a, b, c and d) is made by two input signals In0 and In1 which make up that portion of the DAC control word directed to that particular corresponding Class-A/B switch logic section. An exemplary adaptively configurable Class-A/Class-B circuit is described in detail below.

It should be noted here that the DAC decoder 34 (FIG. 3) will necessarily have as many outputs as there are individual line driver cells to be driven, i.e., the output of the DAC decoder is 26 wide in the exemplary embodiment. Thus, the DAC decoder is capable of providing twenty-six pairs of In0 and In1 control signals; one pair directed to each switch logic and line driver cell combination.

Figure 13:
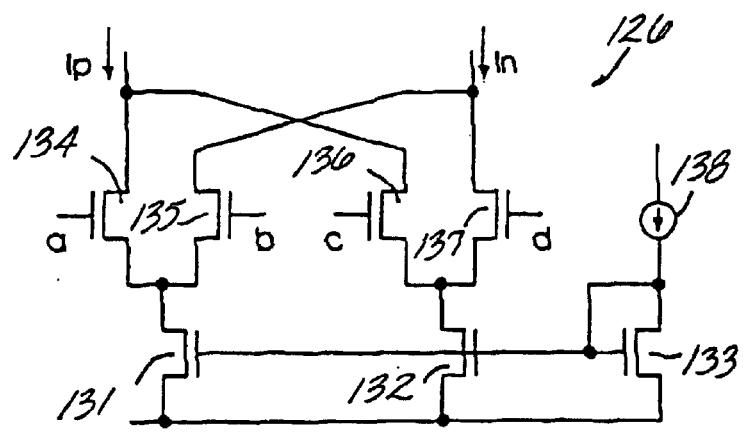
FIG. 13 is a simplified schematic diagram of a DAC line driver cell, configured to operate in accordance with the present invention.

Turning now to FIG. 13, an exemplary embodiment of an individual line driver cell is indicated generally at 126. In general terms, the line driver cell 126 might be aptly described as two differential pairs cross-coupled to define a differential output $(I_p, I_n)$. Current flowing through each of the differential pairs is defined by two n-channel current source transistors 131 and 132 each of which have their gate terminals coupled to a stable bias voltage developed by an n-channel transistor 133 configured as a voltage follower. The bias voltage generated by the MOSFET diode transistor 133 is determined by the characteristic value of a current source 138 which provides a stable current reference to the MOSFET diode transistor 133 such that a stable bias voltage is developed on its gate terminal.

As is well understood in the art, the current source transistors 131 and 132 conduct a characteristic current which is proportional to the current developed by the current source 138, with the proportionality constant being determined by the area ratios of the current source transistor with respect to the MOSFET diode transistor 133. As the term is used herein, "area ratio" refers to the well-known transistor width/length (W/L) ratio.

Operationally, differential output currents are developed by the differential pairs in response to control inputs a, b, c and d, each driving the gate terminal of a respective n-channel transistor 134, 135, 136, and 137 configured as switches. N-channel switch transistor control the output current operation of the driver cell and determine the quanta of current defining the differential outputs.

For example, for matched current sources 131 and 132, each conducting a characteristic current I, when control signals a and c are in a state so as to turn on corresponding switch transistors 134 and 136, while control signals b and d are in a state so as to maintain switch transistors 135 and 137 in an off condition, the $I_p$ output mode will define a current equal to 2×I, while $I_n$ is equal to 0. Other combinations will immediately suggest themselves to one having skill in the art and can be easily determinable by merely turning the various switch transistors on or off along a programmed sequence until all possible binary combinations of control signals states have been exhausted. Thus, transistors 134, 135, 136, and 137, configured as switches, control the output current operation of the line driver cell generated by the current sources.

As noted above, each individual current driver cell can be controlled for either Class-A, Class-B or a combination of Class-A and Class-B operation by operation of the Class-A and Class-B driver control logic circuitry 123 and 124 of FIG. 12B. With reference to the current driver cell 126 of FIG. 13, Class-A and Class-B operation of the driver cell will now be described in connection with the following Table 1 and Table 2.

In particular, Class-A operation of the line driver current cell is characterized by a constant common output current, without regard to the actual value of the differential output current of the cell.

TABLE 1

| INPUT SIGNALS | | | | OUTPUT SIGNALS | | | |
|---|---|---|---|---|---|---|---|
| | | | | | | Diff. | Com. |
| a | b | c | d | Ip | In | Mode | Mode |
| 1 | 0 | 0 | 1 | 1.0*I | 1.0*I | 0 | 2.0*I |
| 1 | 0 | 1 | 1 | 1.5*I | 0.5*I | 1.0*I | 2.0*I |
| 1 | 0 | 1 | 0 | 2.0*I | 0 | 2.0*I | 2.0*I |
| 1 | 1 | 0 | 1 | 0.5*I | 1.5*I | −1.0*I | 2.0*I |
| 0 | 1 | 0 | 1 | 0 | 2.0*I | −2.0*I | 2.0*I |

As illustrated in Table 1, given the particular binary states of the control signals a, b, c and d, the common output current is seen to have a constant value equal to 2.0*I. For example, when control signals a and d are high while control signals b and c are low, the corresponding switch transistors 134 and 137 are both in the on state, causing them each to conduct the full value I of the current generated by the respective current sources 131 and 132. Accordingly, the outputs Ip and In each take on a value of 1.0*I.

As illustrated in the second row of Table 1, when control signal c is taken high, thus turning on the second switch transistor 136 of the corresponding differential pair, each of the transistors of the pair conduct one-half of the current I defined by the respective current source transistor (in this case, transistor 132). Thus, $I_n$ exhibits a value of 0.5*I, while the additional 0.5*I conducted by its mate in the pair is a reflected in the value of $I_p$. Thus, $I_p$ exhibits a value of 1.5*I. The remaining combinations of binary states of the control signals a, b, c, and d necessary to maintain a common output current value of 2.0*I will be evident to those having skill in the art upon examination of the remaining entries with Table 1. Since the output currents ($I_p$ and $I_n$) may take on only five values (0, 0.5*I, 1.0*I, 1.5*I and 2.0*I), all that remains is to ensure that the absolute value sum of the two currents is equal to, in this case, 2.0*I. As illustrated in Table 1, the algebraic sums of the currents define five particular values of differential output current, i.e., −2.0*I, −1.0*I, 0, 1.0*I and 2.0*I as is expected.

Accordingly, a Class-A operated driver cell will be expected to have low EMI emissions but consume a relatively higher amount of power due to the constant common mode output signal. In Class-B operation, however, the driver cell can be operated to produce the same degree of varying differential current output signals but with a varying common-mode current output. In Class-B operation, power consumption is significantly reduced at the expense of higher radiative emissions due to the varying common-mode output current as illustrated in the following Table 2.

TABLE 2

| INPUT SIGNALS | | | | OUTPUT SIGNALS | | | |
|---|---|---|---|---|---|---|---|
| a | b | c | d | Ip | In | Diff. Mode | Com. Mode |
| 0 | 0 | 0 | 0 | 0 | 0 | 0 | 0 |
| 1 | 0 | 0 | 0 | 1.0*I | 0 | 1.0*I | 1.0*I |
| 1 | 0 | 1 | 0 | 2.0*I | 0 | 2.0*I | 2.0*I |
| 0 | 0 | 0 | 1 | 0 | 1.0*I | −1.0*I | 1.0*I |
| 0 | 1 | 0 | 1 | 0 | 2.0*I | −2.0*I | 2.0*I |

In one particular embodiment, such as might be implemented in a transceiver as depicted in FIG. 2, Class-A and Class-B logic circuits (123 and 124 of FIG. 12B) might be implemented to output control signals a, b, c and d which define a truncated set of the differential and common-mode output currents illustrated in Tables 1 and 2, above. As illustrated in FIG. 12B, the DAC control word outputs a pair of control signals In0 and In1 for each logic circuit and line driver cell combination. Necessarily, each control pair of the DAC word is able to take on only four binary values (0:0, 0:1, 1:0 and 1:1).

Figures 14A, 14B:
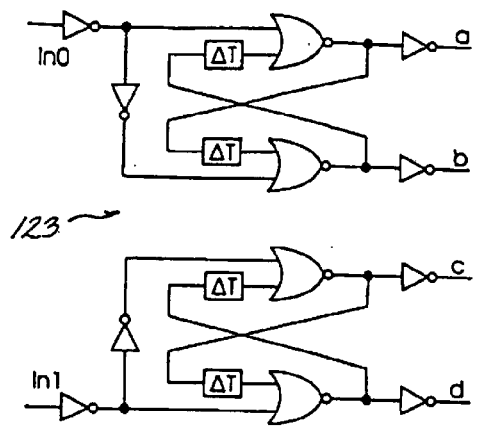
FIG. 14A is simplified schematic representation of Class-A switch logic circuitry.
FIG. 14B is an exemplary truth table illustrating the operation of the Class-A switch circuitry of FIG. 14A.

FIG. 14A is a simplified schematic diagram of one particular implementation of a Class-A logic circuit connected to receive an input control pair from the DAC word and generate the four driver control signals. FIG. 14B illustrates the corresponding logic table for deriving a, b, c and d control signals In0 and In1 in Class-A operation. The Class-A logic circuit, indicated generally at 123, is characterized by mirror image circuits, each including a cross-coupled pair of two-input NOR gates. The output of each NOR gate is buffered by an inverter circuit as are the DAC word control pair inputs. As illustrated in FIG. 14A, each of the two input NOR gates has its cross-coupled input connected through a delay element ΔT which functions to prevent the outputs of each mirror-image circuit from being at a logic low at the same time.

As illustrated in the logic table of FIG. 14B, the DAC control pair In0 and In1 takes on three binary values, i.e., 1:1, 0:1 and 1:0. For the first input value (1:1), only one switch transistor of each differential pair of the driver cell of FIG. 13 is in operation. Thus, both $I_p$ and $I_n$ are at a value of 1.0*I, the differential mode current is 0 and the common-mode current is 2.0*I. In the next input binary state, i.e., 0:1, a and c activate their respective switch transistors causing the $I_p$ output to equal 2.0*I. Since b and d are low, their respective switch transistors are off and In conducts no current. Thus, the differential output current is 2.0*I and the common-mode output current is again 2.0*I. Conversely, when the binary value of the DAC control pair is flipped from the previous state, i.e., 1:0, it will be understood that b and d cause their respective switch transistors 135 and 137 to conduct while the previous conduction pair 134 and 136 are off. Thus, $I_n$ conducts 2.0*I while $I_p$ conducts 0 current. The differential current is thus −2.0*I while the common-mode current is again 2.0*I.

Figures 15A, 15B:
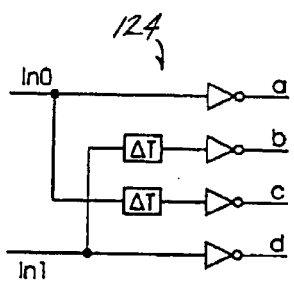
FIG. 15A is simplified schematic representation of Class-B switch logic circuitry.
FIG. 15B is an exemplary truth table illustrating the operation of the Class-B switch circuitry of FIG. 15A.

FIG. 15A is a simplified schematic diagram of a logic circuit adapted to take a DAC control word pair and develop the four control signals a, b, c and d in a manner suitable for operating the driver cell of FIG. 13 in Class-B mode. FIG. 15B is the corresponding logic table for deriving a, b, c and d control signals from In0 and In1 in a Class-B operational mode. As depicted in FIG. 15A, In0 and In1 are buffered through inverter circuits to generate a, c and b, d, respectively.

The corresponding Class-B logic table in FIG. 15B illustrates the logical states of the four driver control signals, the respective Ip and In output drive by the driver cell in response to the control signals, the differential output current and common-mode output current with respect to the same binary values of the DAC control pair (1:1, 0:1 and 1:0) as was the case with FIG. 14B above. From the three input conditions, it will be seen that only the first, i.e., 1:1, gives a different result from the Class-A case described above. The remaining two input conditions, i.e., 0:1 and 1:0, result in the same differential mode and common-mode output current. In the first case, however, all of the four driver cell control signals are 0, thereby defining a differential output current of 0 but with a corresponding common-mode current of 0 as well.

In accordance with the present invention, current driver cell control signals can be adaptively determined by Class-A and Class-B logic circuits in order to choose a driver cell's operational mode in order to meet conflicting requirements of power efficiency and reduced EMI emissions. In order to achieve the highest value of power efficiency, i.e., lowest power consumption, all of the current driver cells would be expected to be placed in Class-B operational mode. Conversely, for the lowest EMI emissions configuration, it would be expected that all of the current driver cells would be configured to operate in Class-A mode. In typical application conditions, a transceiver's transmit DAC would be expected to have its current driver cells operating in mixed Class-A/B mode. For example, in nominal 10BASE-T operation, approximately 40 percent of the cells (ten cells) would be configured to operate in Class-B mode, while 60 percent of the cells (fifteen cells) would be configured to operate in Class-A mode. If the transceiver were anticipated to operate according to the Tx standard, i.e., 1.0 volt swings, ten of the cells would be typically configured to operate in Class-A mode while the remaining fifteen cells would be disabled.

Disabling a particular cell would only require that that cell be placed in Class-B operational mode and the DAC control word pair (In0 and In1) would be set at a binary value so as to put all of the driver cell control signals a, b, c and d in a low state. In the exemplary embodiment, In0 and In1 would be asserted as 1:1. Once all of the current cell control signals are in a low state, the corresponding current cell conducts no current, effectively disabling that cell.

It should be noted that the current driver cells are topologically identical, thus the same current cell is used whether the system is in Class-A or Class-B operational modes. There is therefore no incompatibility between Class-A and Class-B outputs. Further, it should be understood that any number of current driver cells can be configured to operate in Class-A or Class-B modes by merely programming a control PLA to issue the appropriate select signals to the transmitter. The driver cells are therefore fully adjustable and the mix of Class-A and Class-B modes will depend solely on the application desired for the transceiver. For example, notebook computer applications have a great deal of sensitivity toward power consumption while relegating EMI emissions to a secondary consideration. Since notebook computers are battery operated and have a limited power supply lifetime, a transceiver operating in such an environment would be configured to operate primarily in Class-B mode.

Conversely, in an enterprise application, such as a wiring closet, the transceiver would be configured to operate primarily in Class-A mode in order to reduce EMI emissions. Power consumption considerations are typically secondary in such applications.

A transmitter constructed according to the adaptively configurable Class-A/Class-B circuitry is further advantageous in that the same DAC control word (In0 and In1) is used to define the differential signal output in both the Class-A and the Class-B modes, as illustrated in FIGS. 14B and 15B. Since the same current cell is used in both cases, and since the DAC control word remains the same, the system is inherently seamless as a cross-mode platform. No complex decision logic, or multiple DAC decoder architectures are required.

Figure 16:
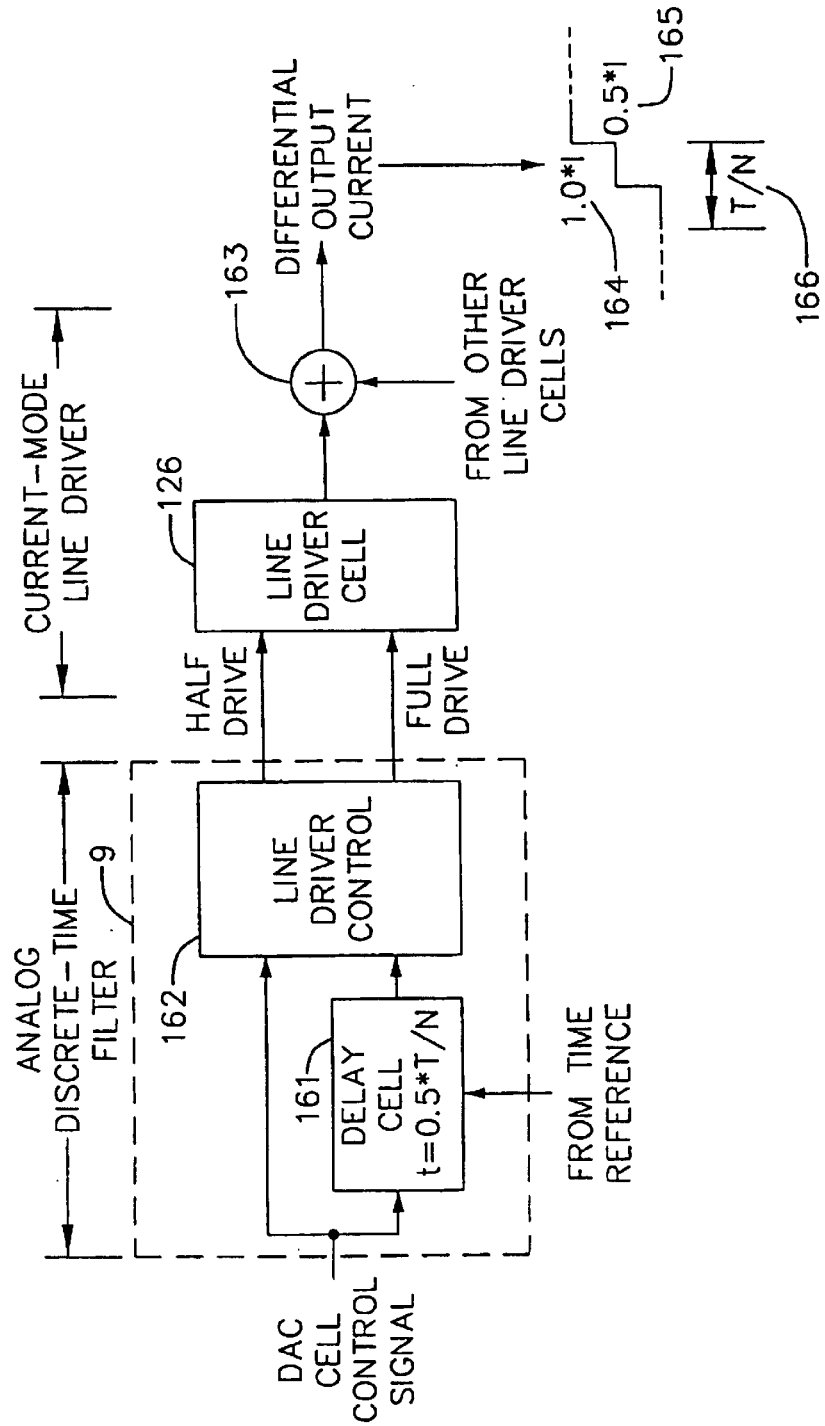
FIG. 16 is a simplified block diagram of an analog discrete-time filter and a line driver cell.

To reduce the undesirable harmonics of the output signal, an analog discrete-time filter 9 is integrated with the DAC line driver 36 in addition to the interpolating digital filter 33 as shown in FIG. 3. Referring now to FIG. 16, each DAC line driver cell 126 is capable of producing ½ the differential output current signal as well as the full differential output current signal. The full differential output current is generated by certain combinations of the class-A/class-B control signals a, b, c, and d as shown in rows 3, and 5 of table 1 and rows 3, and 5 of table 2. The half differential output current is generated by certain combinations of the class-A/class-B control signals a, b, c, and d as shown in rows 2 and 4 of table 1 and rows 2, and 4 of table 2. The control signals a, b, c, and d are derived from the ROM 31 output signals.

For each output sample, the line driver control logic 162 drives the driver cells such that for the first segment of the drive period 166 of T/N, the cell produces ½ the differential output current signal 165. For the second segment of the drive period of T/N, the cell is driven by the line driver control logic 162 to produce the full differential output current signal 164. In one embodiment of the present invention, the delay cell 161 generates the two segments of the drive period.

Figure 17:
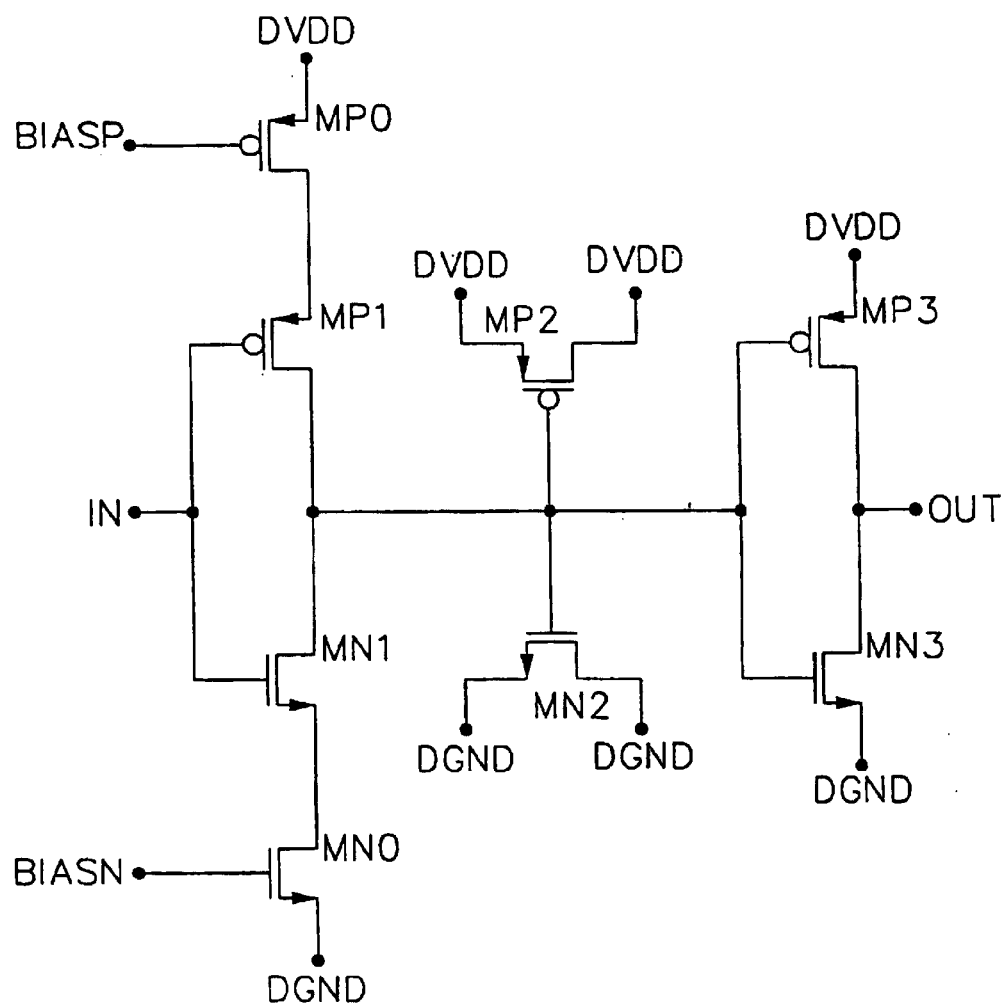
FIG. 17 is a schematic representation of one implementation of a delay cell.

FIG. 17 shows one implementation of the delay cell 161. An inverter is formed at the input stage by MP1 and MN1 MOSFETs. The current through this inverter is limited by MOSFETs MP0 and MN0 biased by BIASP and BIASN, respectively. This limited supply current slows down the inverter. A capacitance is formed by the two MOSFETS MP2 and MN2 to further delay the output of the input stage inverter. The delayed output of the input inverter, is then inverted by MN3 and MP3 MOSFETS to form the OUT signal.

The line driver control logic 162 utilizes an accurate time reference such as a time-accurate delay circuitry 161 or a PLL, such as the one shown in FIG. 11, to drive the line driver cell 126 to either its full amplitude or half of its full amplitude. The currents for each line driver cell 126 are added at node 163 to generate the output signal of the transmitter. In a preferred embodiment, the first time segment and the second time segment are equal to T/2. As a result, the analog discrete-time filter applies nulls to the output spectrum at odd multiples of the interpolation rate, i.e., N/T, 3*N/T, 5*N/T . . . . The first null reduces the image energy around N/T thus providing significant reduction in EMI emissions. For a 20 MHZ digital data input rate and an interpolation rate of eight, the first harmonic at the DAC output is at 160 MHZ. This can be represented by a sinusoid: A=Sin (2Π.160 MHZ. t). After the discrete time filtering at every T/2 (i.e., 3.125 ns), the first harmonic is represented by a summation of two sinusoidal signals: A'=½ Sin(2Π.160 MHZ. t)+½ Sin(2Π.160 MHZ. (t+3.125 ns)). After expanding this equation, all the terms cancel out each other, resulting in a null signal. However, for even multiples of 160 MHZ (N/T) (e.g., 320 MHZ), the terms do no cancel out each other.

Figure 18:
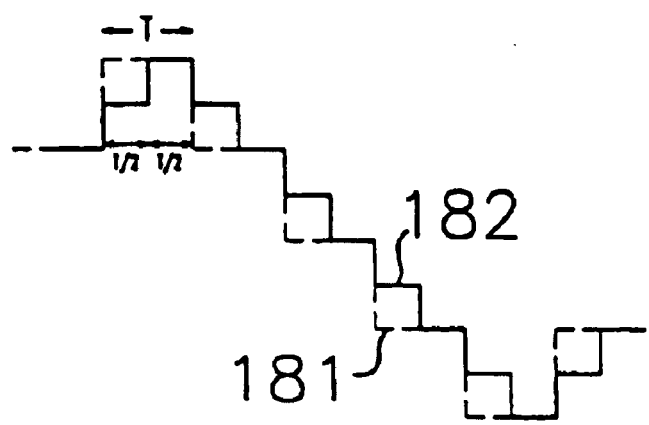
FIG. 18 is a simplified timing diagram of a signal before and after discrete-time filtering.

FIG. 18 depicts a magnified view of signal 181 (the dotted lines) and signal 182 (solid lines) that the result of performing the analog discrete time filtering on the signal 181. As displayed by signal 182 in FIG. 18, the effective result achieved by discrete-time filtering of signal 181 is similar to interpolation or over-sampling by 2 by a digital filter. However, this technique is performed with less circuit complexity which results in reduced silicon area and lower cost.

Figure 21A:
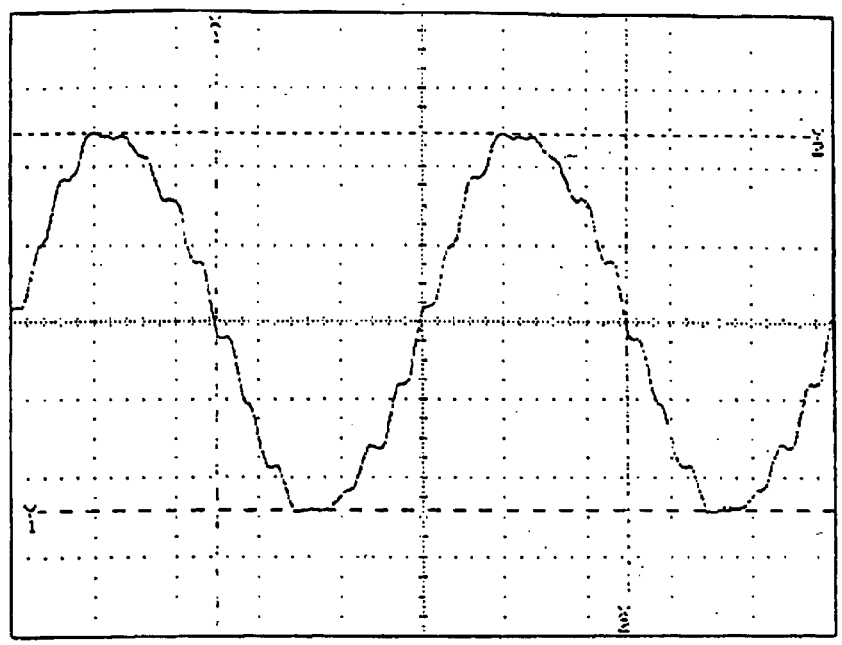
FIG. 21A is a simplified timing diagram of a signal before discrete-time filtering.
Figure 21B:
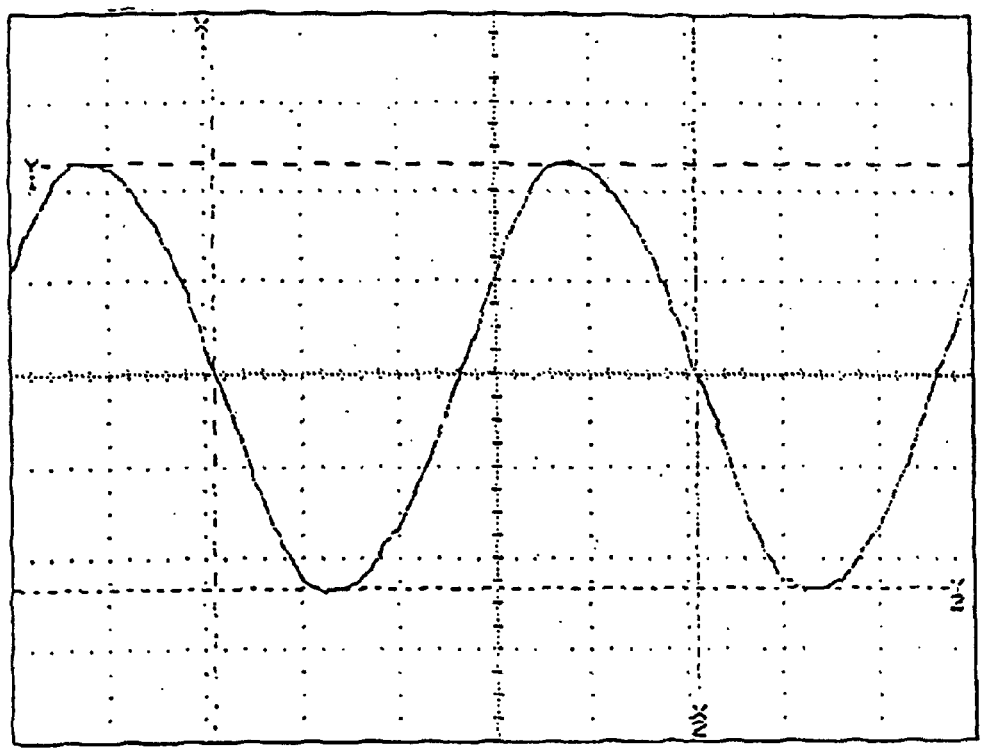
FIG. 21B is a simplified timing diagram of the signal in FIG. 21A after discrete-time filtering.

FIG. 21A shows an example of a 10Base-T sinusoidal input signal running at 10 MHZ. The resulting discrete-time filtered signal is shown in FIG. 21B that has smoother edges resulting in a reduction of EMI emission.

Figure 19:
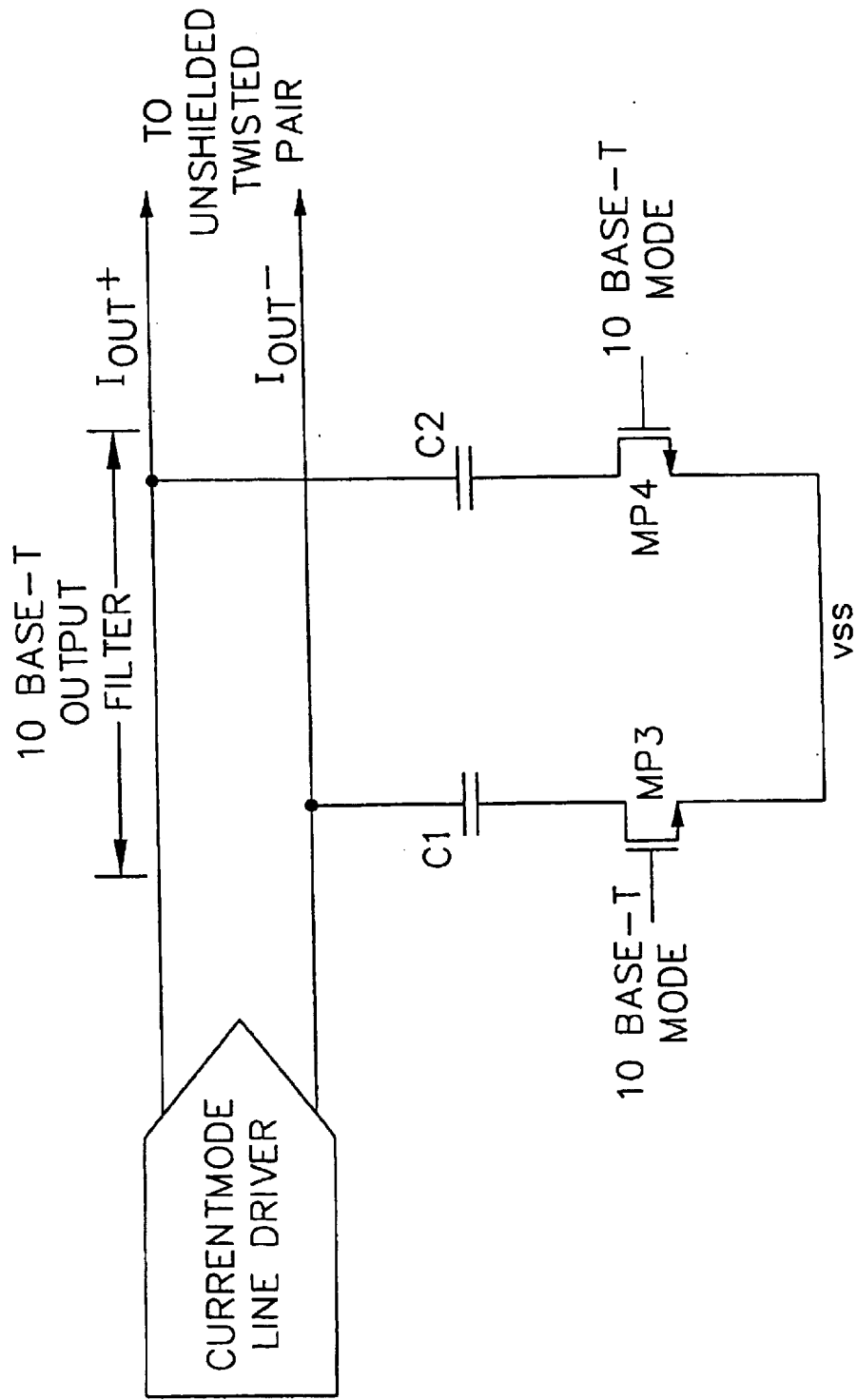
FIG. 19 is a semi-schematic block diagram of one implementation of an analog output filter.
Figure 20:
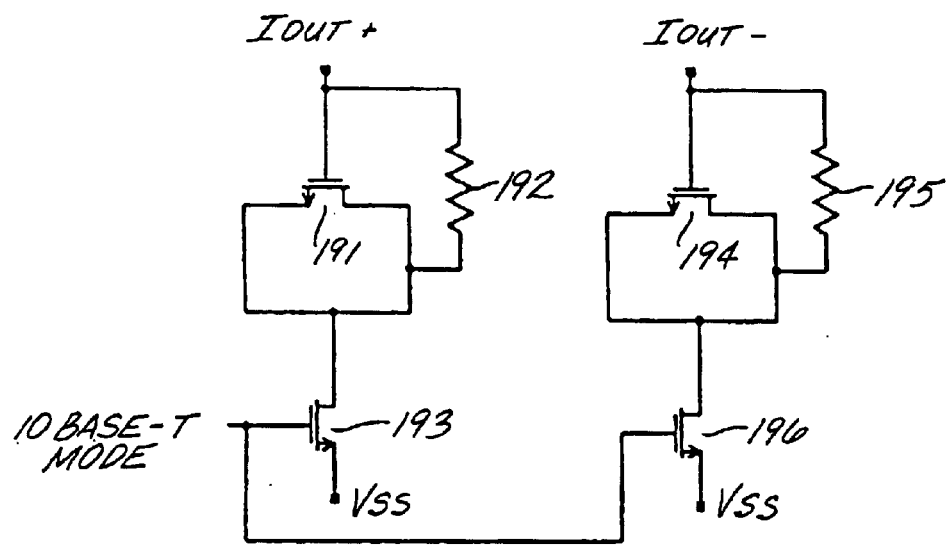
FIG. 20 is a schematic representation of one implementation of an analog output filter.

As illustrated in FIG. 19, in one embodiment, a pair of capacitors, C1 and C2, are added to the outputs of the line driver 36 in 10Base-T mode to provide additional high frequency filtering. The capacitors can be either external (discrete) capacitors or on-chip capacitors as shown in FIG. 20. Each integrated capacitors of FIG. 20 is formed by connecting the sources and drains of the respective MOSFET 191 or 192 together to form the bottom plate of each respective capacitor. A resistor (192 or 194) is connected in parallel across each formed capacitor as shown in FIG. 20. The top plate of each capacitor in FIG. 19 and FIG. 20 is connected to one of the two differential DAC outputs, respectively.

A MOSFET switch (193 or 196) is connected to the bottom plate of each capacitor and ground (VSS). A control signal, 10Base-T mode, controls switch 193 and switch 196. In 10Base-T mode, the switches are turned on connecting the bottom plate of each capacitor to ground (VSS), thus activating the capacitors. This creates a first-order filter at the DAC output comprising the capacitor and the resistive component of the transmission load. The first-order filter provides high frequency filtering for the differential output signal as well as any common-mode signal generated by the DAC.

In 100Base-TX or 1000Base-T where tighter output return loss is needed, the switches are turned off. The bottom plate of each capacitor is left floating, having a high impedance connection to ground (VSS) through the off-impedance of the switch. This mode disables the first-order filter and preserves the wide-band high output impedance of the DAC.

The transmit signal cancellation circuit 5 of FIG. 1 incorporates first and second replica transmitters, each of which are connected to and operatively responsive to a digital word representing an analog signal to be transmitted. The first replica transmitter is coupled to the receive signal path and develops a voltage mode signal which is equal to but opposite in phase of a voltage mode portion of the transmit signal. The second replica transmitter is also coupled to the receive signal path and develops a current mode signal having a direct phase relationship with the transmit signal. The voltage mode and current mode signals are combined with the transmit signal on the receive signal path and, in combination, cancel voltage and current mode components of the transmit signal that might appear at the inputs of the receiver during simultaneous transmission and reception. In one particular aspect of the invention, the main transmitter and the first and second replica transmitters are constructed as current mode digital-to-analog converters.

Figure 22:
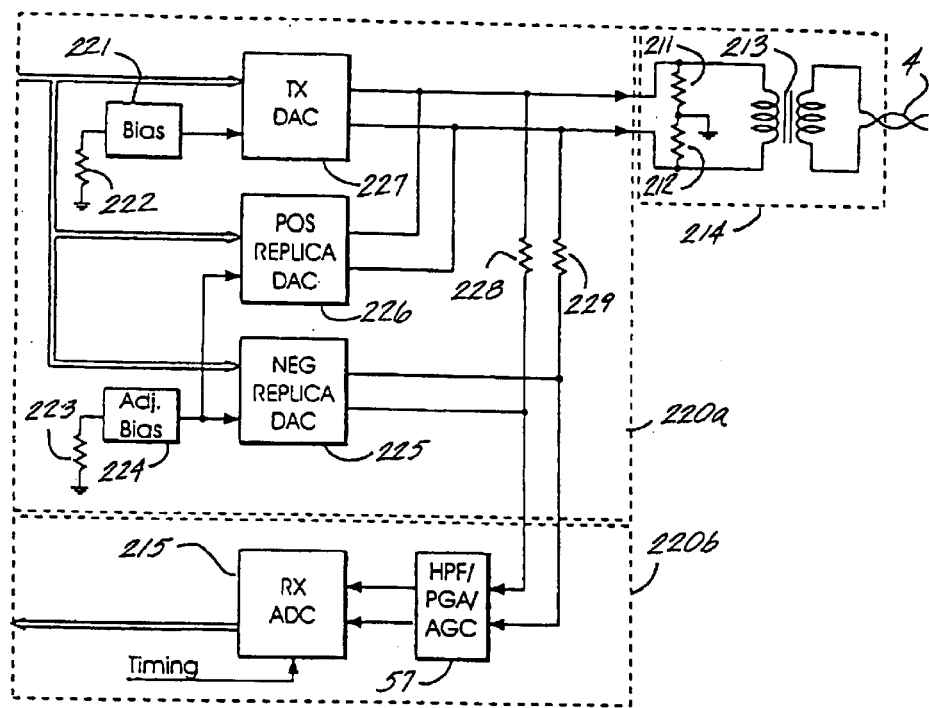
FIG. 22 is a semi-schematic, simplified block diagram of one arrangement of an integrated transceiver including transmission signal cancellation circuitry and a simplified line interface, in accordance with the present invention.

FIG. 22 depicts a semi-schematic, simplified block diagram of one arrangement of an integrated transceiver, including transmission signal cancellation circuitry in accordance with the present invention. The integrated transceiver is so termed because it is implemented as a single integrated circuit chip. However, the transceiver is conceptually and functionally subdivided into a transmitter section 220*a* and a receiver section 220*b* connected to communicate analog bidirectional data in full duplex mode over unshielded twisted pair (UTP) wiring, such as might be encountered in a typical local area network (LAN) architecture. In the exemplary embodiment of FIG. 22, the transmitter section 220*a* and receiver section 220*b* are coupled to a UTP transmission channel through a line interface circuit 214 which provides DC offset cancellation, and the like between the transceiver signal I/O and a twisted pair transmission channel 4.

In accordance with practice of principles of the invention, the transceiver's transmit section 220*a* is implemented to include a main transmit digital-to-analog converter (TX DAC) 227 connected to receive a digital transmit signal and convert that signal into positive and negative analog current mode signals suitable for transmission over the twisted pair transmission channel 4.

In like fashion, the receiver section 220*b* receives positive and negative analog current mode signals from the transmission channel and converts them into a digital representation in a receive analog-to-digital converter (RX ADC) circuit 215. Following analog-to-digital conversion, receive signals are directed to downstream circuitry in which digital representation of the receive signal is demodulated, filtered and equalized by digital signal processing (DSP) circuitry as described in connection with FIG. 2. Prior to digital conversion, the analog receive signal may be pre-processed by analog front end circuitry 57 which is often adapted to condition and analog receive signal to a form suitable for conversion by the receive ADC 215.

Front end circuitry 57 might suitably include a high pass or a band pass filter configured to remove a certain amount of noise and interference from a raw analog receive signal. Band pass filtration is often implemented in architectures where the transmission channel is subdivided into a number of different pass bands each adapted to carry certain types of intelligence. Band pass filtration thus allows only signals occurring in desirable portions of the channel spectrum to be directed to the receive ADC 215 for conversion and further signal processing.

Analog front end circuitry 57 might also include automatic gain control circuitry, input buffer amplifiers, and the like, with various combinations being implemented depending on how the particular channel is configured and also depending on the input requirements of the receive ADC 215, as is well understood by those having skill in the art.

From FIG. 22, it is evident that the signal lines carrying the positive and negative analog receive signals are coupled between the receiver section 220*b* and the line interface circuit 214 in parallel with the signal lines carrying the positive and negative analog transmit signals. Necessarily, analog signals being transmitted to a remote transceiver simultaneously with another remote transceiver's communicating an analog receive signal to the receiver section 220*b*, will be asserted both on the transmit signal lines as well as on the parallel-connected receive signal lines.

Accordingly, in the absence of any conditioning or cancellation circuitry, an analog transmit signal will superpose over an analog receive signal at the analog front end 57 and/or the RX ADC 215. Given the substantially greater signal to noise ratio (SNR) of a non-channel impaired transmit signal to a receive signal which is subject to channel impairment, leakage, echos, and the like, it is evident that such an analog transmit signal would substantially perturb a receive signal, making analog-to-digital conversion and downstream signal processing substantially more difficult.

Signal conditioning or cancellation of the analog transmit signal from the analog receive signal path is accomplished by cancellation circuitry which is coupled into the transmit and receive signal paths at a 3-way signal nexis between the transmit DAC 227, the receive ADC 215 and the line interface circuit 214. Cancellation circuitry suitably includes two quasi-parasitic current mode digital-to-analog converters, termed herein a positive replica DAC 226 and a negative replica DAC 225, in combination with first and second cancellation resistors 228 and 229. The positive and negative replica DACS 226 and 225, respectively, are so termed because of the relationship of their signal sense configurations with respect to the positive and negative output signal lines of the TX DAC 227.

In the case of the positive replica DAC 226, its positive signal line is coupled to the positive signal line output from the transmit DAC 227 while its negative signal line is, likewise coupled to the negative signal line of the transmit DAC. In the case of the negative replica DAC 225, its positive signal line is coupled through cancellation resistor 229 to the negative signal line output from the transmit DAC 227. The negative replica DAC's negative signal line is coupled through cancellation resistor 228 to the positive signal line of the transmit DAC. Each of the DACs 227, 226 and 225 are coupled to receive the same digital transmit signal, i.e., the signal intended for conversion by the transmit DAC 227 and transmission over the channel 4 through the line interface circuit 214. Thus, the input to all of the DACs is an identical signal.

In operation, the negative replica DAC 225 may be implemented as a current mode DAC and functions, in combination with cancellation resistors 228 and 229, to define a cancellation voltage, with equal value but opposite phase to the output defined by the transmit DAC 227. Because a negative replica DAC is likewise coupled, in reverse fashion, to the receive ADC 215, the cancellation voltage may also be thought of as applied to the analog front end. Thus, voltage components of a transmit signal are removed from the receive signal lines prior to their introduction to the analog front end.

Because the cancellation voltage is developed by sourcing/sinking current through cancellation resistors 228 and 229, the excess currents sourced/sunk by the negative replica DAC 225 must also be compensated at the output signal lines in order to ensure a proper output voltage at the line interface circuit 214. The positive replica DAC 226 provides the necessary current cancellation function by sinking/sourcing a matched, but opposite phase, current to that developed by the negative replica DAC, thus resulting in zero excess current at the load, indicated in the line interface circuit 214 of FIG. 22 as series-connected resistors 211 and 212, disposed between the positive and negative output signal paths and including a common center tap to a ground potential. It should be mentioned that the configuration of the line interface circuit illustrated in FIG. 22 is an AC equivalent circuit. It will be understood that the circuit is able to be represented in several DC configurations, which will exhibit the same or a substantially similar AC characteristic. Thus the line interface circuit 214 is exemplary.

In operation, cancellation resistors 228 and 229 define cancellation voltages between the outputs of the transmit DAC 227 and the inputs to the receive ADC 215 as a function of a bias current, developed by an adjustable bias circuit 224. The adjustable bias circuit 224 is connected to the positive replica DAC and the negative replica DAC and provides an adjustable bias current to each of the circuit components. The cancellation voltage developed by the cancellation resistors 228 and 229 must cancel the output voltage of the transmit DAC 227 such that the signal at the receive ADC terminals closely track only a signal received from a remote transmitter at the other end of the transmission channel 4. The cancellation voltage across each cancellation resistor is necessarily equal to the value of the cancellation resistor times the current through that resistor (current sourced/sunk by the negative replica DAC). In order to provide effective cancellation, this cancellation voltage must be equal to the output voltage of the transmit DAC which is, in turn, equal to the current produced by the transmit DAC times the load resistance at each terminal (resistor 211 or resistor 212 in parallel with one half the distributed resistance value of the twisted pair wire of the transmission channel).

In accordance with the exemplary embodiment, transmit DAC 227 is implemented as a current mode DAC and defines an output current which is a function of a bias current, in turn defined by a bias circuit 221, the current gain of the bias circuit 221 and the current gain of the transmit DAC 227. Likewise, the cancellation voltage developed by the negative replica DAC 225 is a function of the values of cancellation resistors 228 and 229, the current gain of the adjustable bias circuit 224 and the current gain of the negative replica DAC 225.

Figure 23:
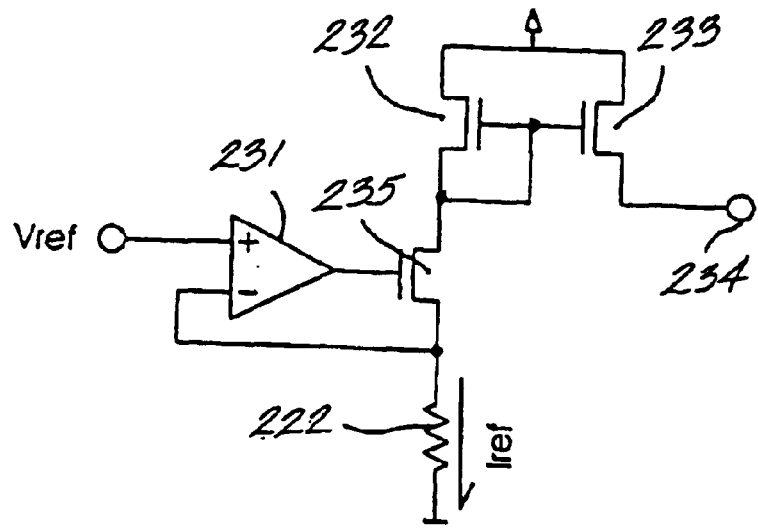
FIG. 23 is a semi-schematic, simplified circuit diagram of one implementation of a precision bias current generator for the transmit DAC of FIG. 22.

FIG. 23 is a simplified circuit schematic diagram of the bias circuit 221 of the transmit DAC 227. In simple terms, the bias circuit 221 might be described as a voltage follower in combination with a bias resistor which develops a stable reference current through one leg of a current mirror. The stable reference current is mirrored to an output current having a particular value defined by the stable reference current and the transistor geometries of the devices defining the current mirror.

In particular, a reference voltage ($V_{REF}$) is applied to the positive terminal of an operational amplifier 231 whose output controls the gate terminal of an N-channel transistor 235. The N-channel transistor 235 is configured as a voltage follower, by having its source terminal fed back to the negative input of the operational amplifier 231. A current source transistor 232 is coupled between the voltage follower device 235 and a power supply potential such as $V_{DD}$ so as to supply a source of current to the voltage follower device 235. As will be understood by those having skill in the art, the voltage follower device, in combination with the operational amplifier 231 function to impress a stable voltage at the device's source node which is equal to the value of the reference voltage $V_{REF}$ applied to the positive terminal of the operational amplifier 231. A bias resistor 222 is coupled between the voltage follower's source node and ground potential, so as to define a particular current value therethrough equal to the reference voltage $V_{REF}$ divided by the value of the bias resistor 222. This current is mirrored to a mirror transistor 233 which is configured with its gate terminal in common to the current source transistor 232. Thus, the mirror transistor 233 conducts a proportional amount of current to the current source transistor 232, with the proportionality governed solely by the ratio of the sizes of the mirror transistor to the current source transistor.

If, for example, with a given reference $V_{REF}$ the value of bias resistor 222 were selected in such a way as to define a current of 1 mA through current source transistor 232, and if mirror transistor 233 were constructed to have a width over length (W/L) ratio of twice that of the source transistor, mirror transistor 233 would define a bias current of 2 mA at the bias circuit output 234. Thus, the bias current developed by bias circuit 221 will be understood to be a stable current which is a function of $V_{REF}$, the bias resistor 22 and the ratio of transistor sizes of the current mirror. The ratio of transistor sizes of the current mirror determines the current gain of the mirror and is easily calculable and adjustable during circuit design.

Figure 24:
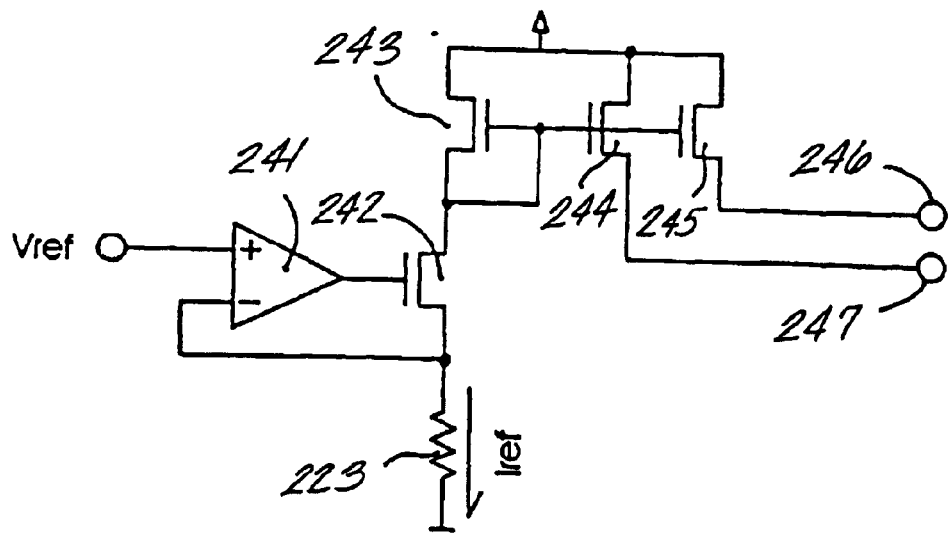
FIG. 24 is a semi-schematic, simplified circuit diagram of one implementation of a variable bias current generator for the replica DACs of FIG. 22.

Turning now to FIG. 24, there is depicted a simplified transistor schematic diagram for the adjustable current bias circuit 224 of FIG. 22. The construction and operation of the adjustable current bias circuit 224 is similar to construction and operation of the bias circuit 221 described in connection with FIG. 23 above. An operational amplifier 241 is operatively responsive to a reference voltage $V_{REF}$ and controls the gate terminal of an N-channel transistor configured as a voltage follower 242 to mirror the reference voltage value at its source terminal. A bias resistor 223 is coupled between the source terminal and ground potential in order to develop a reference current therethrough in a manner similar to the bias resistor 222 of FIG. 23. A current source transistor 243 is coupled between $V_{DD}$ and the source terminal of the voltage follower transistor 242 and mirrors the reference current to parallel-coupled mirror transistors 244 and 245. Mirror transistors 244 and 245 each define a bias current at respective output nodes 247 and 246 of the adjustable bias circuit 224.

In contrast to the bias circuit 221 of FIG. 23 above, the mirror transistors 244 and 245 are each constructed to be ⅕ the size (have ⅕ the W/L ratio) of the current source transistor 243. If the reference current developed across bias resistor 223 was designed to have a value of 1 mA, the current conducted by mirror transistors 244 and 245 would necessarily have a value equal to about 0.2 mA. Thus, the current gain of adjustable bias circuit 98 would be in the range of about 0.2, while the current gain of 224e bias circuit 221 would be in the range of about 2.0.

In a particular embodiment of the present invention, the bias currents developed by mirror transistors 244 and 245 are able to be adjusted to compensate for variations in transmission line load in order to produce a null transmission signal voltage at the inputs to the receive ADC. Bias current adjustment may be made by adaptively changing the value of bias resistor 223 in order to adaptively modify the value of the reference current developed therethrough. Adjusting the value of the bias resistor 223 can be carried out internally by trimming the resistor at the time the apparatus is packaged as an integrated circuit, or by adaptively writing a control word to a control register that controls the configuration of a resistor ladder. Likewise, it will be understood that adjustment may be made externally by coupling a potentiometer or variable resistor in parallel with bias resistor 223.

Alternatively, bias current adjustment may be made by dynamically changing, or adjusting, the sizes of the mirror transistors 244 and 245 as well as the size of the source transistor. In the present exemplary case, where a 1:5 ratio between currents is desired, the current source transistor might be constructed as an array of fifty (50) transistors, and each of the mirror transistors might be constructed as an array of ten (10) transistors. As changes in the current ratio become desirable, fuse-links coupling the transistors into the array might be "opened" by application of a current, thereby removing a selected transistor or transistors from the array.

Adjusting a bias current by adaptively "trimming" transistors gives a high degree of flexibility and control to the actual value of the current output by the circuit. Transistor trimming of transistors configured in a series-parallel array allows incremental fine tuning of currents, the precision of which is limited only by the number of transistors in the array and the unit widths (W) and lengths (L) used for the elemental transistors.

Returning now to FIG. 22, it should be noted that the current gains of the transmit DAC 227, the positive replica DAC 226 and the negative replica DAC 225 are all designed to be matched and identical. This is accomplished by replicating the integrated circuit design of the transmit DAC to the positive and negative replica DACS. Thus, since the transistor layout and design parameters of all of the DACs are similar it would be expected that the performance characteristics, such as gain, of the DACs would be similar as well. In like fashion, the circuit design and layout of the bias circuit 221 is replicated in the adjustable bias circuit 224, with the exception of the transistor sizings of the mirror transistors. Thus, the current gain of the adjustable current bas circuit 224 is expected to proportionally track the current gain of current bias circuit 221 over the corners of integrated circuit manufacturing process variations. That is, if the gain of bias circuit 221 is skewed in one direction by a certain percentage, the gain of the adjustable bias circuit 224 will be expected to also vary in the same direction by approximately the same percentage. Accordingly, the ratio of the bias current developed by bias circuit 221 to the bias currents developed by adjustable bias circuit 224 will remain substantially constant.

In accordance with the principles of the invention, the current gain of the adjustable bias circuit 224 is chosen to be substantially smaller than the current gain of bias circuit 221, in order to minimize the current and power requirements of the positive and negative replica DAC's line driver circuitry. Accordingly, the values for the cancellation resistors 228 and 229 are selected so as to develop a cancellation voltage equal to the transmit DAC output voltage, based on the designed current gains. In other words, based on Ohm's law, the smaller the output current, larger the required cancellation resistors in order to produce a fixed cancellation voltage equal to the transmit DAC output voltage.

Because the positive replica DAC 226 is closely matched in performance characteristics with a negative replica DAC 227, the current that the negative replica DAC sources/sinks is canceled by a matched current sunk/sourced by the positive replica DAC. This current cancellation results in zero excess current at the transmit DAC output, leaving only the desired transmit signal at the line interface load.

In order to ensure stability of the voltage cancellation function over manufacturing process parameter, power supply voltage and thermal variations, the adjustable bias circuit resistor 223 and the cancellation resistors 228 and 229 are constructed from the same semiconductor material (polysilicon, for example) and are laid out in proximity to one another so as to track each other over process parametric, power supply and/or thermal variations. In this manner, induced cancellation voltages across cancellation resistors 228 and 229, will be understood to be independent of process variations. Because the positive replica DAC 226 is driven by the same adjustable bias circuit 224 as the negative replica DAC 225, the cancellation currents developed by the positive replica DAC will be expected to closely track the currents developed through negative replica DAC 225.

One particular utility of the present invention may be found in its ability to produce a cancellation signal which is substantially a mirror image of a simultaneously asserted transmit signal and provide the cancellation signal at the input of a transceiver's receive ADC or analog front end. The effectiveness of the present invention will be more clearly understood with reference to the timing diagram of FIG. 25 which illustrates the signal state at various nodes in the exemplary transceiver circuit of FIG. 22. For example, the periodic signal depicted at FIG. 25(a) might represent the source voltage developed by a remote transceiver at the other end of the transmission line which is to be received by the local transceiver. The signal depicted at FIG. 25(c) might represent an analog transmit signal developed by the local transmitter and which is simultaneously asserted to the line interface circuit and the transmission channel as the intended receive signal depicted at FIG. 25(a). The signal illustrated in FIG. 25(b) represents the signal that might be seen on the channel (4 of FIG. 22) and might be described as a linear combination of the transmit signal (c) and the receive signal (a) along with such impairments as are common in UTP transmission channels.

Figure 25:
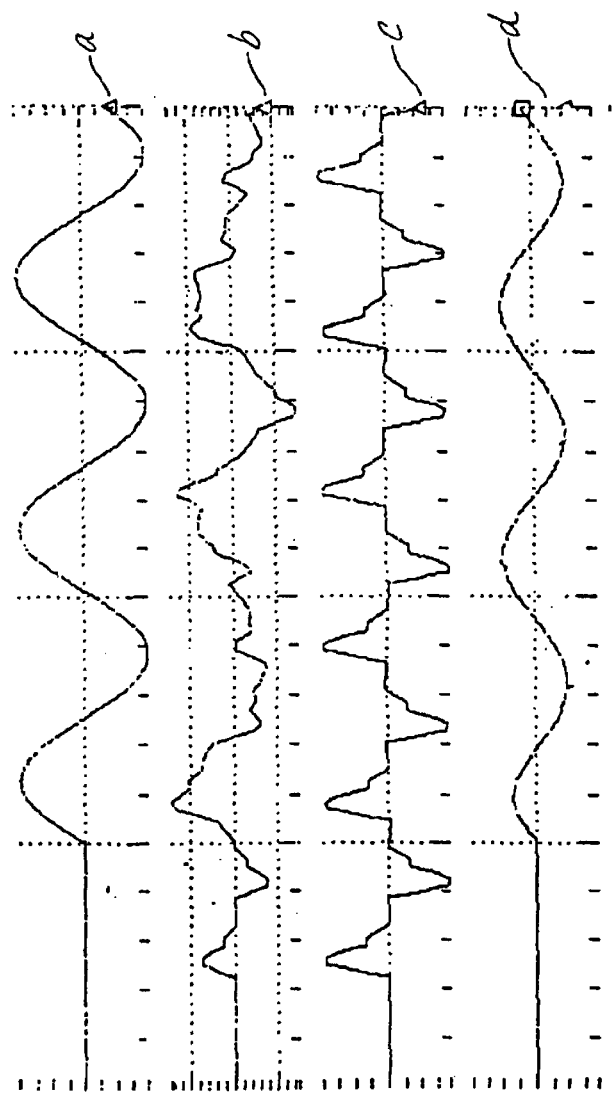
FIG. 25 is a simplified timing diagram illustrating transmission signal perturbation of a receive signal and the effects of transmission signal cancellation in accordance with the present invention.

The signal depicted at FIG. 25(d) represents the signal appearing at the input to the analog front end or the receive ADC, after the transmit cancellation signal has been subtracted from the combination signal at (b). As can be seen from the waveform diagrams of FIG. 25, the receive signal (d) has a substantially greater fidelity to the original signal (a) than the combination signal (b) appearing on the channel.

Notwithstanding its ability to effectively and accurately cancel local transmit signals from a local receiver's input signal path, the invention is additionally advantageous in that it obviates the need for complex and costly external magnetic hybrid circuits to interface between a transceiver in a twisted pair transmission channel. In particular, as can be seen in FIG. 22, the line interface circuit 214, between the transceiver and the channel, can be simply implemented by a pair of series coupled resistors and a relatively simple transformer element (indicated at 213 in FIG. 22) which, in the present case, is needed only to provide common-mode voltage rejection and DC isolation between the channel and the transceiver I/O.

Further, transmit signal cancellation circuitry and the line interface circuit are particularly suitable for implementation in a single chip integrated circuit. The replica DACs and resistors are all constructed of common integrated circuit elements and can be implemented on a single chip along with the remaining components of a high speed bidirectional communication transceiver. In accordance with the invention, only the transformer portion of a line interface circuit is contemplated as an off-chip circuit element. Even though the exemplary embodiment contemplates the transformer being provided off-chip, it will be understood by those familiar with integrated circuit design and fabrication that suitable transformers can be constructed from integrated circuit elements, such as combinations of spiral inductors, and the like, and still provide sufficient DC coupling between a transmission channel and an integrated circuit transceiver.

While the adaptive signal cancellation circuitry has been described in terms of integrated circuit technology implementing a gigabit-type multi-pair ethernet transceiver, it will be evident to one having skill in the art that the invention may be suitably implemented in other semiconductor technologies, such as bipolar, bi-CMOS, and the like as well as be portable to other forms of bidirectional communication devices that operate in full duplex mode. Moreover, the circuitry according to the invention may be constructed from discrete components as opposed to a monolithic circuit, so long as the individual components are matched as closely as possible to one another.

A multi-transmitter communication system may be configured for transmitting analog signals over a multi-channel communication network. The system is constructed to incorporate M transmitters, each having an output for serving a transmit signal on a transmit signal path electrically coupled between each communication channel and the output of the respective transmitter. A timing circuit is electrically coupled to each transmitter for providing the required timing signals for each transmitter. The timing signals for the transmitters define a clock domain that is staggered in time resulting in a respective phase shift of the output signals of each transmitter. In one embodiment of the present invention, the timing signals are staggered in time for predetermined time intervals to reduce aggregate electromagnetic emission caused by signal images centered around integer multiples of frequency Fi of the M transmitters. M timing references staggered in time by $1/(F_i*M)$ are generated by the timing circuit to drive the output of each of the M transmitters respectively.

Figure 26:
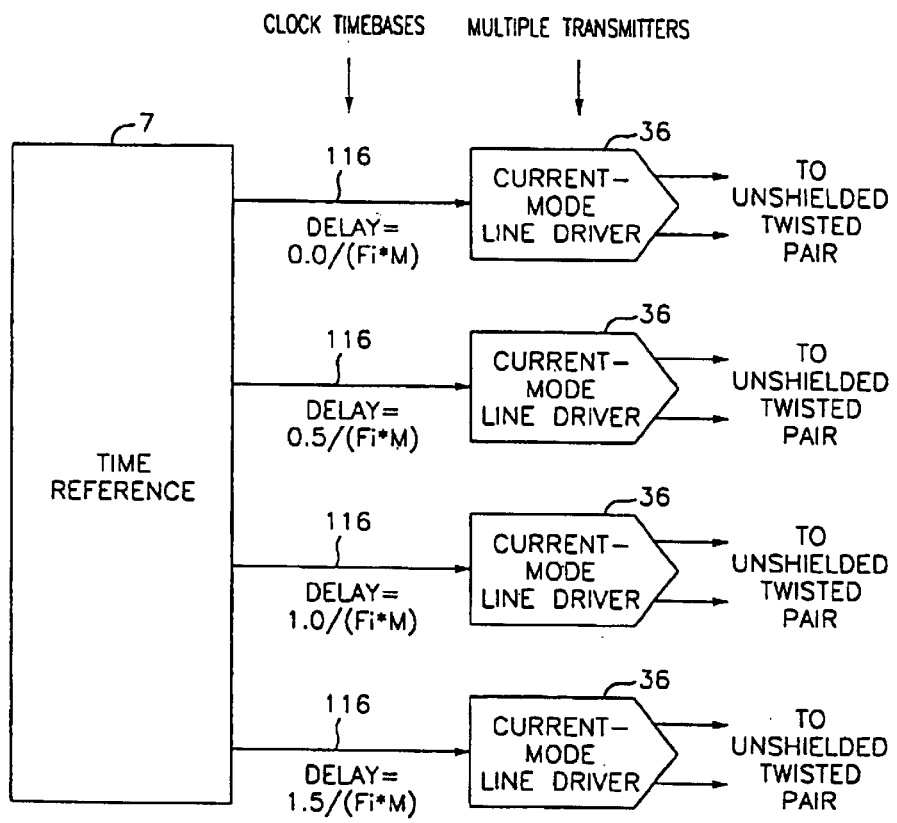
FIG. 26 is a simplified block diagram of multiple transmitters configured for reduction of aggregate emissions, in accordance with the present invention.

Referring now to FIG. 26, an emission reduction technique for four transmitters is shown. In one embodiment of the present invention, a common time reference circuit 7 provides the required timing signals to all of the transmitters, however, the time reference to each transmitter is delayed by a predetermined period of time. The time reference staggered delays, 116a to 116d, of each transmitter is chosen to reduce the aggregate EMI emissions of the system. This approach also reduces the noise from the system power supplies by requiring smaller current requirement at a given time. This technique can be extended to systems with several transmitters such that the time reference to the multiple transmitters are staggered on a PCB or an IC chip using delay lines or delay logic. The time staggering signals can be derived, for example, from a PLL as shown in FIG. 5.

Assuming an output sample frequency of Fi, images contributing to EMI emissions for each transmitter are centered around 1*Fi, 2*Fi, 3*Fi, . . . , the time references of M transmitters are staggered in time by $1/(F_i*M)$. This timing arrangement places nulls, in the aggregate EMI emissions, at 1*Fi, 2*Fi, 3*Fi, . . . except at frequency multiples of M*Fi. This staggering technique reduces the EMI emissions caused by images located around the null frequencies.

Figure 27:
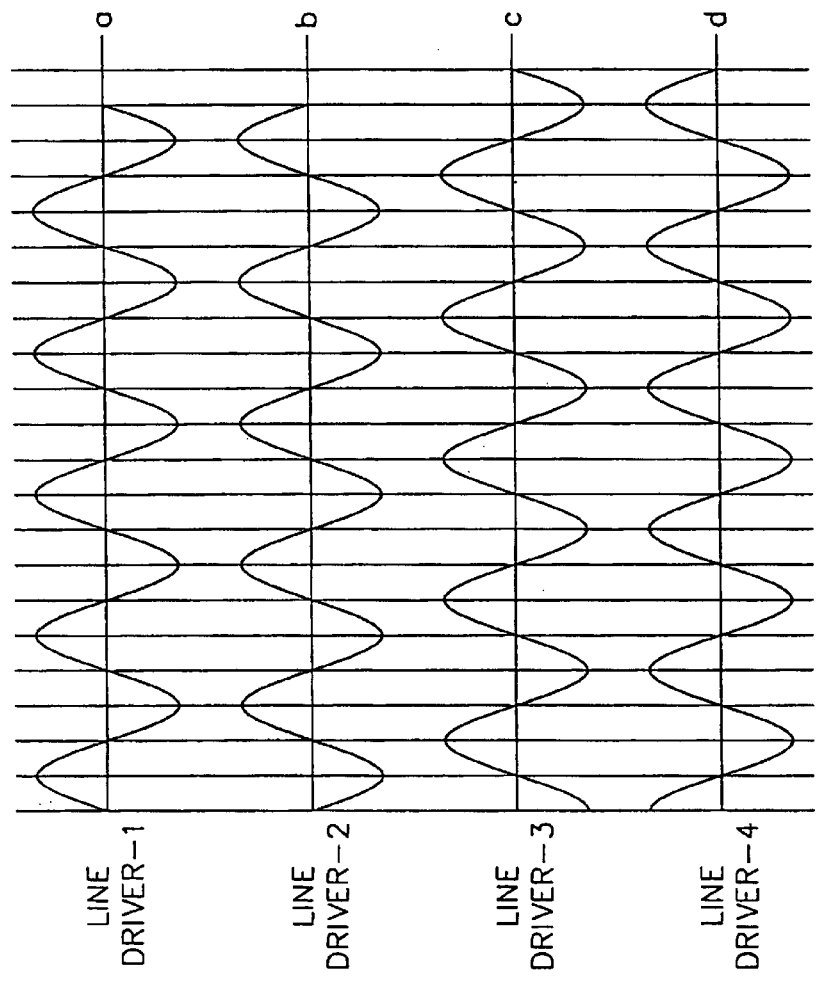
FIG. 27 is simplified timing diagram of the image component of a four-transmitter system.

As an example, images of a single 10Base-T transmitter are located at 160 MHz, 320 MHz, 480 MHz, . . . . For an application which implements four transmitters on a single chip, the time references are staggered by 1.5625 ns (1/(Fi*M)). This reduces the aggregate EMI emissions of the single chip device at 160 MHz, 320 MHz, 480 MHz, 800 MHz, . . . but not at 640 MHz, 1280 MHz, . . . . FIG. 27 shows the image components of four exemplary transmitters. The images are each shifted by 90 degrees in phase, and by 1.5625 ns in time. As illustrated by the timing diagram of FIG. 6, the aggregate power of the images is zero.

For the above 10Base-T example, the aggregate image voltage of four transmitters, before any staggering, can be represented by:
V=Sin(2Π.160 MHZ. t)+Sin(2Π.160 MHZ. t)+Sin(2Π.160 MHZ. t)+Sin(2Π.160 MHZ. t)=4 Sin(2Π.160 MHZ. t).

However, after staggering the timing reference of each transmitter by 1.5625 ns (Δt), the aggregate image voltage is:
V'=Sin(2Π.160 MHZ. t)+Sin(2Π.160 MHZ. (t+Δt))+Sin(2Π.160 MHZ. (t+2Δt))+Sin(2Π.160 MHZ. (t+3Δt). The terms of this equation cancel out each other at 160 Mhz. The same cancellation effect occurs for images at 320 MHz, 480 MHz, 800 MHz, . . . but not at 640 MHz, 1280 MHz, . . . . This technique can be implemented in any electronic subsystem including PCBs and IC chips.

The staggered timing signals can be accurately generated by a timing circuit, such as a PLL that includes a Voltage Control Oscillator (VCO). FIG. 11 depicts a PLL used for generating thee required staggered timing signals for the multiple transmitter configuration in one embodiment of the present invention. Other techniques for generating timing reference signals known in the art of circuit design may also be used to generate the required staggered timing signals.

The present invention is additionally advantageous in that it can be configured to operate between and among various Ethernet transmission standards. In particular, by merely disabling or re-enabling groups of memory arrays and current driver cells, the transmitter according to the invention can operate under 10BASE-T, 100BASE-T, 100BASE-Tx and 1000BASE-T standards seamlessly. Thus, a single integrated circuit transceiver is able to perform a multiplicity of roles under a variety of conditions in a seamless and flexible manner.

Neither are the principles of the invention limited to the particular Ethernet standards discussed above. As standards evolve, differing digital filtering and output voltage swing requirements are easily accommodated by the present invention by changing the contents of the memory device, and changing the "width" of the DAC control word and the number of driver cells to capture the new requirements. Nor is the invention limited by the number of cells making up a voltage step. DAC resolution and accuracy can be further enhanced by defining "quarter" cells, and the like, and making appropriate changes to the decoder and switching logic sections.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A communication system including a differential signal transmitter, the transmitter comprising:

a DAC decoder circuit, the DAC decoder circuit outputting DAC control words corresponding to digital input signals;

a differential current mode driver cell array;

a selection circuit, the selection circuit asserting control signals in operative response to DAC control words, the selection circuit placing individual cells of the current driver cell array into a first operational mode sensitive to a first metric or into a second operational mode sensitive to a second metric in response to a select signal.

2. The communication system according to claim 1, wherein the first metric corresponds to radiative emissions and wherein the second metric corresponds to power consumption.

3. The communication system according to claim 2, each differential current mode driver cell comprising:
- first and second current sources, each conducting an equal quanta of current;
- first and second differential pairs, each pair coupled to a respective current source;
- a pair of differential outputs, a first output connected to a first transistor comprising each of the differential pairs, a second output connected to a second transistor comprising each of the differential pairs; and
- four control signal inputs, each input controlling to a respective one of the transistors comprising the first and second differential pairs.

4. The communication system according to claim 3, further comprising:
- a first logic circuit connected to receive the DAC control word, the first logic circuit asserting control signals which operate a corresponding signal component output circuit in the first mode; and
- a second logic circuit connected to receive the control word, the second logic circuit asserting control signals which operate a corresponding signal component output circuit in the second mode.

5. The communication system according to claim 4, each differential current mode driver cell comprising:
- first and second current sources, each conducting an equal quanta of current;
- first and second differential pairs, each pair coupled to a respective current source;
- a pair of differential outputs, a first output connected to a first transistor comprising each of the differential pairs, a second output connected to a second transistor comprising each of the differential pairs; and
- a set of control signal inputs, each input of the set controlling a respective one of the transistors comprising the first and second differential pairs.

6. The communication system according to claim 5, the first and second logic circuits each defining control signals in response to a DAC control word, said first and second differential pairs operatively responsive to said control signals to output a differential signal in either the first mode or the second mode.

7. The communication system according to claim 6, wherein the DAC control word is the same when the first and second differential pairs output a differential signal in either the first mode or the second mode.

8. The communication system according to claim 7, wherein the first mode is a Class-A mode and wherein the second mode is a Class-B mode.

* * * * *